United States Patent
Kanetaka et al.

(10) Patent No.: US 9,766,431 B2
(45) Date of Patent: Sep. 19, 2017

(54) IMAGING LENS AND IMAGE PICKUP APPARATUS

(71) Applicant: Sony Corporation, Tokyo (JP)

(72) Inventors: Fumikazu Kanetaka, Chiba (JP); Hisashi Uno, Tokyo (JP)

(73) Assignee: SONY CORPORATION, Tokyo (JP)

( * ) Notice: Subject to any disclaimer, the term of this patent is extended or adjusted under 35 U.S.C. 154(b) by 156 days.

(21) Appl. No.: 13/962,048

(22) Filed: Aug. 8, 2013

(65) Prior Publication Data

US 2014/0071333 A1 Mar. 13, 2014

(30) Foreign Application Priority Data

Sep. 11, 2012 (JP) ................. 2012-199073

(51) Int. Cl.
 G02B 13/00 (2006.01)
 G02B 9/34 (2006.01)
 G02B 13/18 (2006.01)

(52) U.S. Cl.
 CPC ........... *G02B 13/0015* (2013.01); *G02B 9/34* (2013.01); *G02B 13/002* (2013.01); *G02B 13/0045* (2013.01); *G02B 13/18* (2013.01)

(58) Field of Classification Search
 None
 See application file for complete search history.

(56) References Cited

U.S. PATENT DOCUMENTS

| | | | | |
|---|---|---|---|---|
| 5,519,540 A | * | 5/1996 | Suzuki | G02B 15/16 359/684 |
| 5,592,334 A | * | 1/1997 | Oshikiri et al. | 359/689 |
| 5,805,359 A | * | 9/1998 | Yamanashi | 359/753 |
| 6,028,716 A | * | 2/2000 | Kato | G02B 15/177 359/676 |
| 2007/0146897 A1 | * | 6/2007 | Hozumi et al. | 359/680 |
| 2009/0310225 A1 | * | 12/2009 | Matsusaka | G02B 15/177 359/676 |
| 2010/0188553 A1 | * | 7/2010 | Mihara et al. | 348/340 |
| 2011/0176215 A1 | * | 7/2011 | Mouri | G02B 1/113 359/601 |
| 2012/0013993 A1 | * | 1/2012 | Uchida | G02B 15/163 359/684 |
| 2012/0069456 A1 | * | 3/2012 | Suzuki | G02B 13/0045 359/716 |
| 2012/0127590 A1 | * | 5/2012 | Muratani et al. | 359/689 |

FOREIGN PATENT DOCUMENTS

| | | |
|---|---|---|
| JP | 2010-039088 A | 2/2010 |
| JP | 2011-064919 A | 3/2011 |
| JP | 2012-063676 A | 3/2012 |

* cited by examiner

*Primary Examiner* — Roberto Velez
*Assistant Examiner* — Quan Pham
(74) *Attorney, Agent, or Firm* — Chip Law Group

(57) ABSTRACT

An imaging lens includes: a movable lens group configured to travel to allow the imaging lens to come into focus; and a rearmost lens group arranged at a most-image-sided fixed position, and having negative refractive power. Following conditional expression is satisfied, $$-2 < ft/fr < -0.45 \qquad (1)$$

where ft is a total focal length of the imaging lens in a condition that the imaging lens is in focus on an object at infinite, and fr is a focal length of the rearmost lens group.

18 Claims, 13 Drawing Sheets

IMAGING LENS AND IMAGE PICKUP APPARATUS

BACKGROUND

The present disclosure relates to an imaging lens that has a focusing function and is suitably used in an electronic camera such as a digital video camcorder and a digital still camera. The present disclosure also relates to an image pickup apparatus that uses such an imaging lens.

Recently, a digital video camcorder, a digital still camera, etc. that use a solid-state image pickup device such as a CCD (Charge Coupled Device) and a CMOS (Complementary Metal-Oxide Semiconductor) have been rapidly in wide spread use. Due to the spread of such digital cameras etc., a demand has been increased for a high-performance imaging lens that has superior portability and is suitable for high pixel density. Moreover, recent needs are various, which can be seen from some users requiring not only a zoom lens but also a single-focus lens that has a fixed focal length.

As a need for the single-focus lens, the single-focus lens is expected to have a half angle of view covering a wide angle around 30 degrees, a large aperture ratio having an open F number of about F2, compact size, and high performance. As such an imaging lens, a retrofocus-type imaging lens is known. However, the retrofocus-type imaging lens tends to have long total optical length (for example, see Japanese Unexamined Patent Application Publication No. 2010-39088). On the other hand, Japanese Unexamined Patent Application Publication Nos. 2011-64919 (JP2011-64919A) and 2012-63676 (JP2012-63676A) disclose an imaging lens that is intended to reduce size by adopting telephoto type. An imaging lens disclosed in JP2011-64919A includes a negative lens group, a positive lens group, a positive lens group, and a negative lens group that are arranged in order from object plane, and has a half angle of view of about 25 degrees and an open F number around 2.8. An imaging lens disclosed in JP2012-63676A includes a positive lens group, a positive lens group, and a negative lens group that are arranged in order from object plane, and has a half angle of view of about 30 degrees and an open F number around 2.0.

SUMMARY

However, in the imaging lenses disclosed in JP2011-64919A and JP2012-63676A, sufficient reduction in total thickness along an optical axis of component lenses and in total optical length is not achieved. Therefore, the camera is prevented from being compact upon both carrying and shooting. In order to further reduce size, in general, it is necessary to improve refractive power of each lens. However, in that case, it is difficult to favorably correct various kinds of aberration. Therefore, it has been difficult to achieve an imaging lens that has large aperture ratio and high performance. For example, it has been difficult to achieve an imaging lens that has reduced size while having a half angle of view covering a wide angle of about 30 degrees, a large aperture ratio having an open F number around 2.0, and favorable optical performance.

It is desirable to provide an imaging lens and an image pickup apparatus capable of reducing size thereof while having wide angle, a large aperture ratio, and favorable optical performance.

According to an embodiment of the present disclosure, there is provided an imaging lens including: a movable lens group configured to travel to allow the imaging lens to come into focus; and a rearmost lens group arranged at a most-image-sided fixed position, and having negative refractive power, wherein following conditional expression is satisfied, $$-2 < ft/fr < -0.45 \quad (1)$$

where ft is a total focal length of the imaging lens in a condition that the imaging lens is in focus on an object at infinite, and fr is a focal length of the rearmost lens group.

According to an embodiment of the present disclosure, there is provided an image pickup apparatus with an imaging lens and an image pickup device outputting an image pickup signal based on an optical image formed by the imaging lens, the imaging lens including: a movable lens group configured to travel to allow the imaging lens to come into focus; and a rearmost lens group arranged at a most-image-sided fixed position, and having negative refractive power, wherein following conditional expression is satisfied, $$-2 < ft/fr < -0.45 \quad (1)$$

where ft is a total focal length of the imaging lens in a condition that the imaging lens is in focus on an object at infinite, and fr is a focal length of the rearmost lens group.

In the imaging lens and the image pickup apparatus of the above-described embodiments of the present disclosure, a telephoto-type configuration is achieved by providing negative refractive power in the rearmost lens group. Accordingly, reduction is achieved in the size of the lens system that tends to be large when the large aperture ratio is achieved.

According to the imaging lens and the image pickup apparatus of the above-described embodiments of the present disclosure, refractive power arrangement in whole of the imaging lens is optimized and a lens configuration of each lens group is optimized. Therefore, reduction in size is achieved while wide angle, a large aperture ratio, and favorable optical characteristics are achieved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
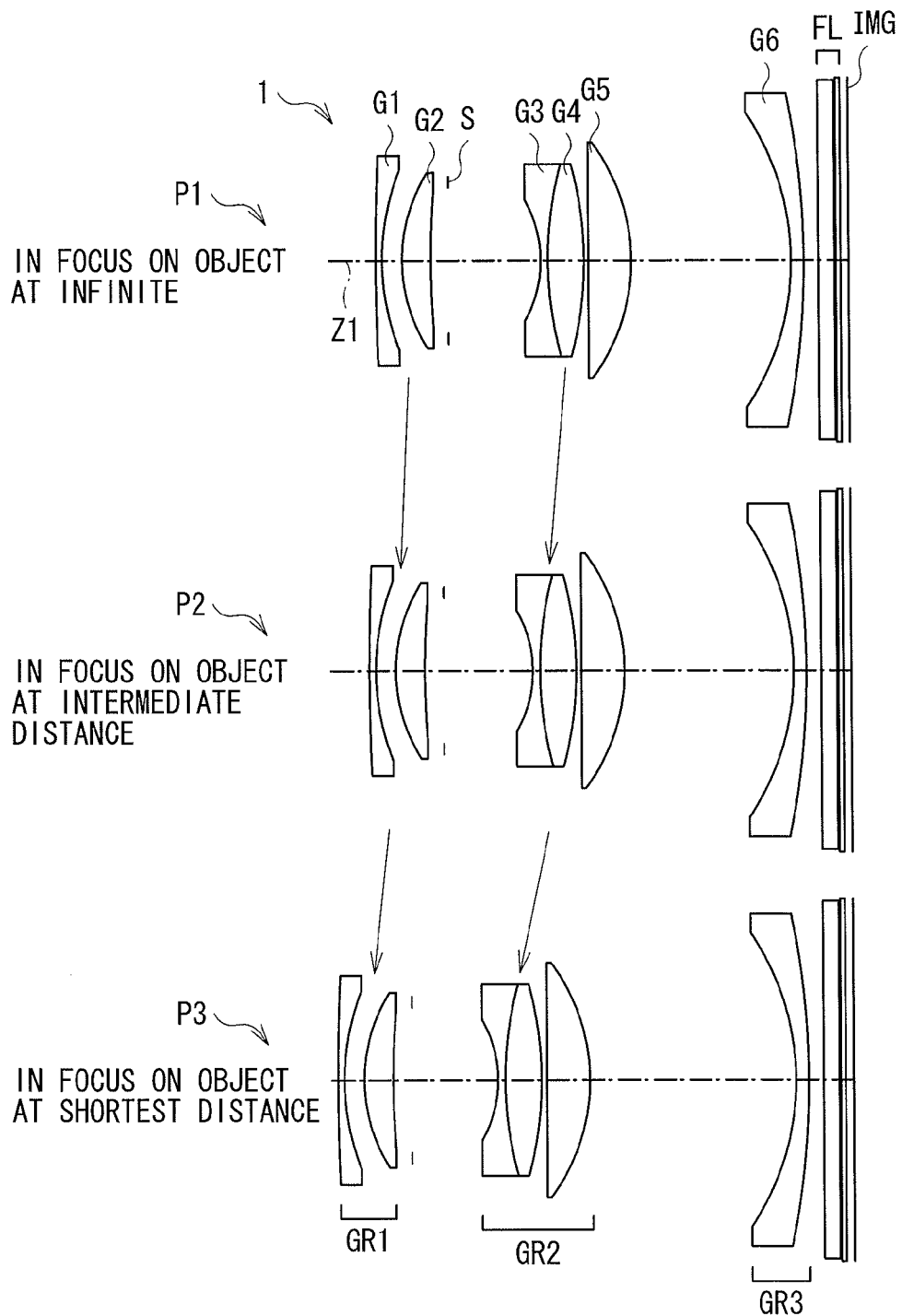
FIG. 1 is a lens cross-sectional view illustrating a first configuration example of an imaging lens according to an embodiment of the present disclosure, together with a traveling state of respective lens groups upon focusing.

An embodiment of the present disclosure will be described below in detail referring to the drawings. The description will be given in the following order.
1. Basic Configuration of Lens
2. Functions and Effects
3. Example of Application to Image Pickup Apparatus
4. Numerical Examples of Lens
5. Other Embodiments

[1. Basic Configuration of Lens]

Figure 5:
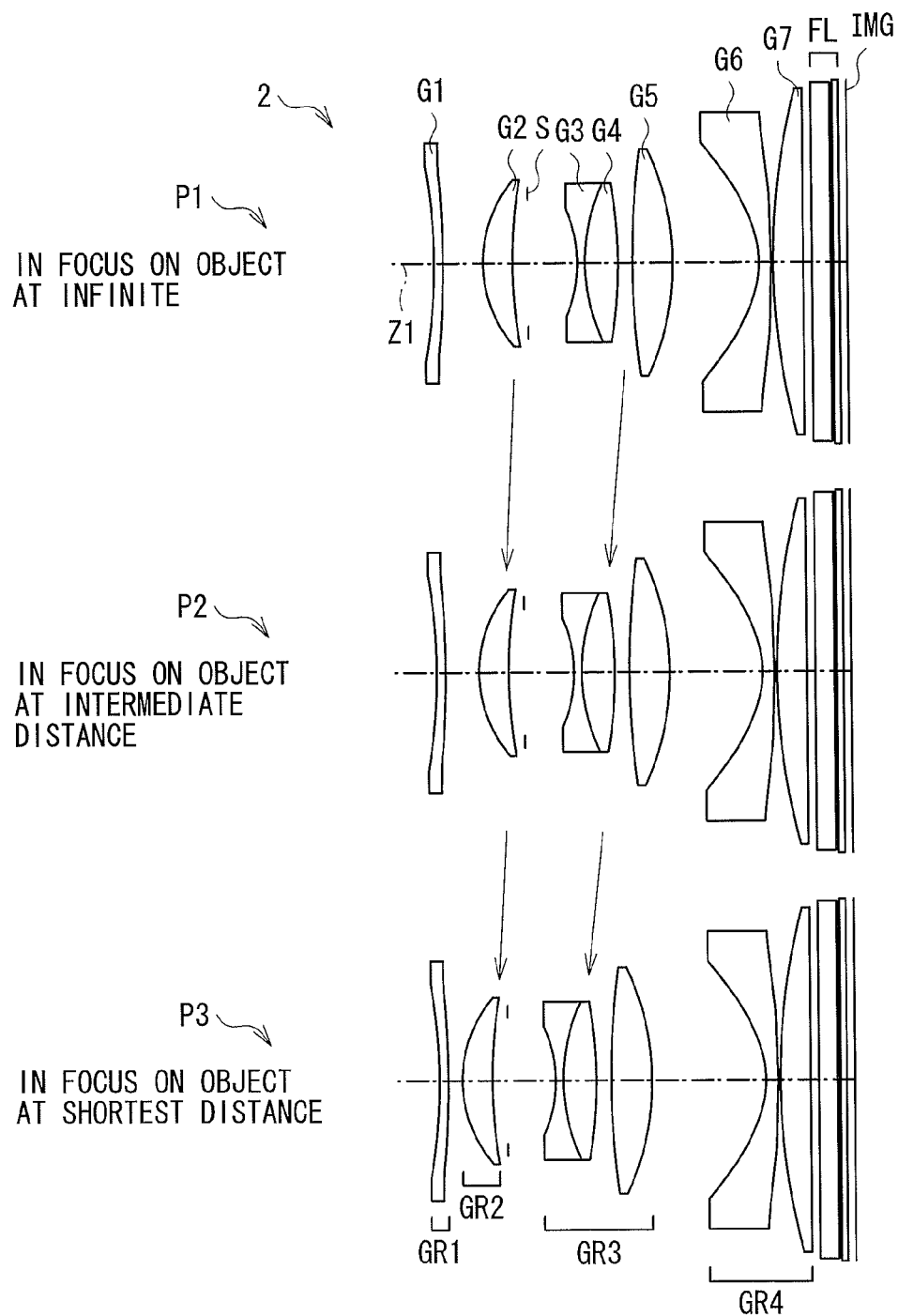
FIG. 5 is a lens cross-sectional view illustrating a second configuration example of the imaging lens, together with a traveling state of respective lens groups upon focusing.
Figure 9:
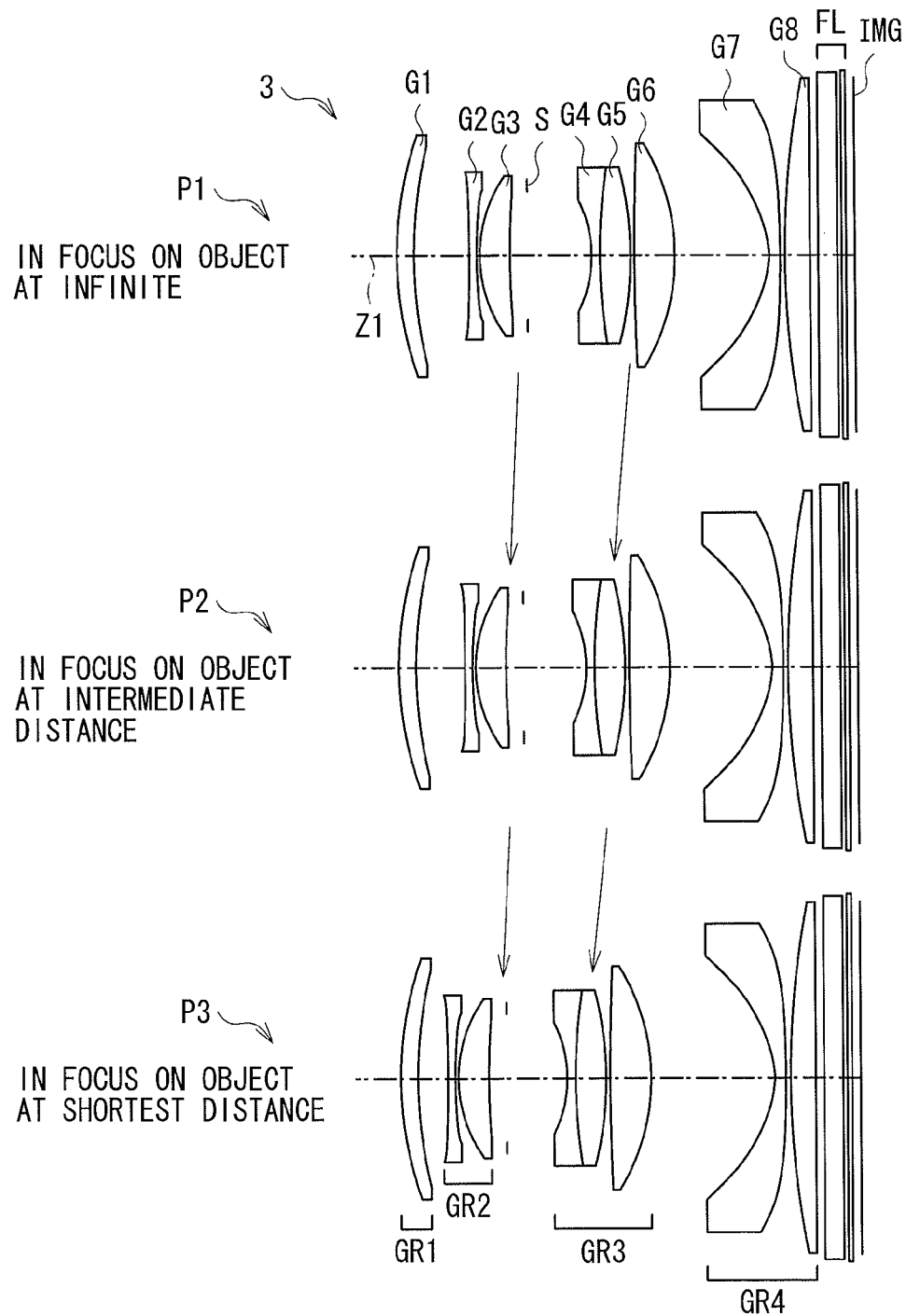
FIG. 9 is a lens cross-sectional view illustrating a third configuration example of the imaging lens, together with a traveling state of respective lens groups upon focusing.
Figure 13:
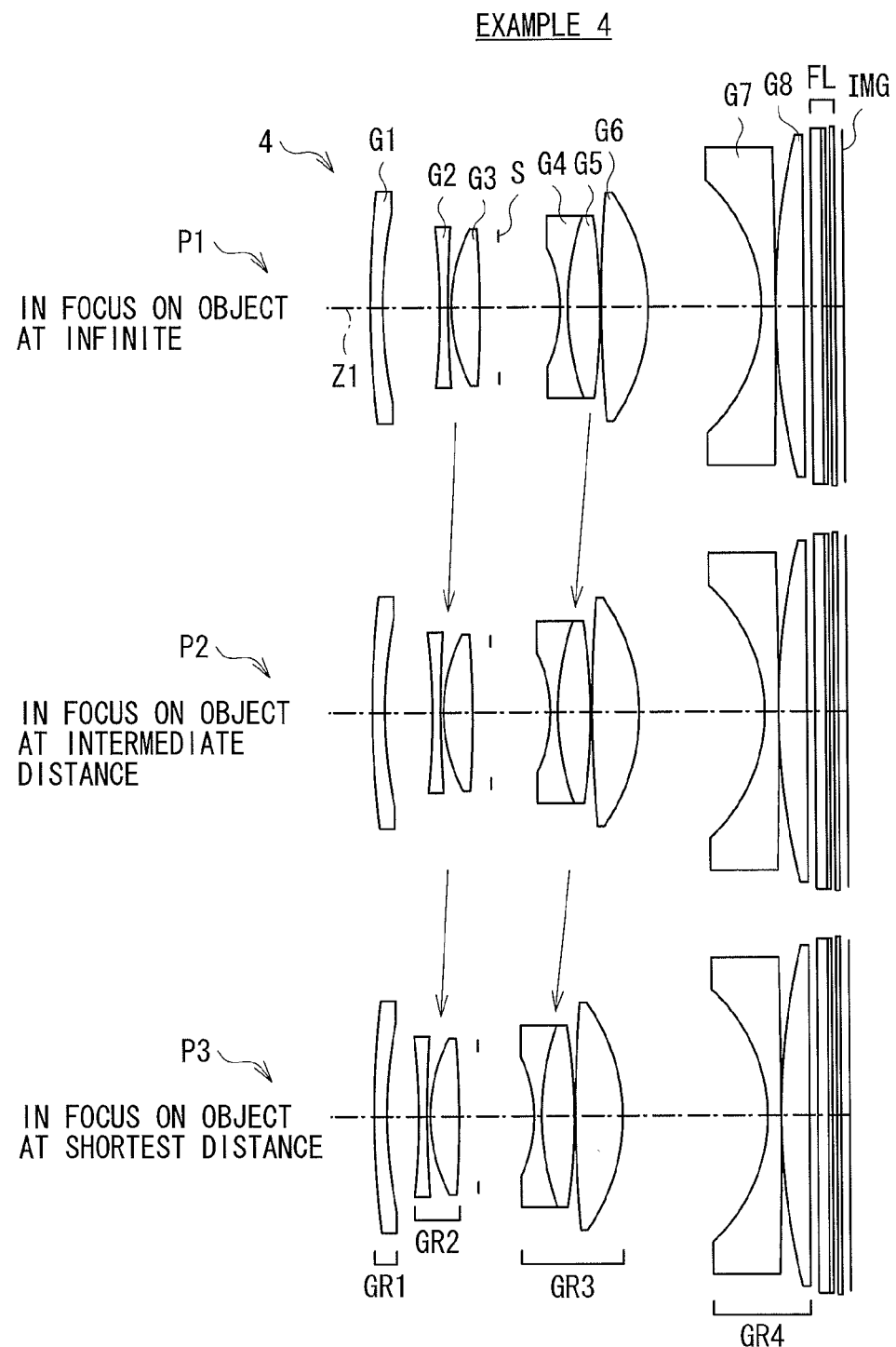
FIG. 13 is a lens cross-sectional view illustrating a fourth configuration example of the imaging lens, together with a traveling state of respective lens groups upon focusing.

FIG. 1 illustrates a first configuration example of an imaging lens according to an embodiment of the present disclosure. The configuration example corresponds to a lens configuration in Numerical Example 1 which will be described later. Similarly, second to fourth configuration examples that correspond to lens configurations in Numerical Examples 2 to 4 which will be described later are shown in FIGS. 5, 9, and 13, respectively. In FIG. 1 etc., a symbol "IMG" indicates image plane and "Z1" indicates an optical axis. Hereinbelow, a configuration of the imaging lens according to the present embodiment will be described in correspondence with the configuration example shown in FIG. 1 etc. where appropriate. However, the technology of the present disclosure is not limited to the configuration examples shown in the drawings.

The imaging lens according to the present embodiment includes a movable lens group that travels to allow the imaging lens to come into focus, and a rearmost lens group that is arranged at a most-image-sided position, is fixed, and has negative refractive power. Also, the imaging lens according to the present embodiment satisfies Conditional Expression (1) which will be described later. The rearmost lens group may be desirably configured of two or less lenses that include a negative lens. For example, the rearmost lens group may be desirably configured of one negative lens and one positive lens. The negative lens in the rearmost lens group may desirably have an aspherical surface.

In the first configuration example in FIG. 1, a first lens group GR1 and a second lens group GR2 each correspond to the movable lens group, and a third lens group GR3 corresponds to the rearmost lens group. In the configuration examples in FIGS. 5, 9, and 13, the second lens group GR2 and the third lens group GR3 each correspond to the movable lens group, and the fourth lens group GR4 corresponds to the rearmost lens group.

FIG. 1 etc. show, from the upper side, a lens arrangement at a lens position P1 in a state that the imaging lens is in focus on an object at infinite, at a lens position P2 in a state that the imaging lens is in focus on an object at an intermediate distance, and at a lens position P3 in a state that the imaging lens is in focus on an object at a shortest distance, together with a traveling path on which the lens groups travel upon focusing. A solid-line arrow indicates that the lens groups travel upon focusing. The traveling lens group is present at a position indicated by the arrow in accordance with variation in shooting distance.

In addition thereto, the imaging lens according to the present embodiment may desirably satisfy predetermined conditional expressions and the like which will be described later.

[2. Functions and Effects]

Next, description will be given of functions and effects of the imaging lens according to the present embodiment. Together therewith, a desirable configuration will be described.

In the imaging lens of the present embodiment, a telephoto-type configuration is achieved by allowing the rearmost lens group to have negative refractive power, and reduction is achieved in size of the lens system that tends to be large when large aperture ratio is achieved. By configuring the imaging lens in the above-described matter and allowing the imaging lens to satisfy Conditional Expression (1) described later, reduction in size of the lens system is achieved while favorably correcting field curvature.

Moreover, positions that a central light ray in a screen and an off-axial light ray pass are separated from each other in the rearmost lens group. Therefore, by arranging an aspherical surface in the rearmost lens group, off-axial aberration that is easily caused in a wide-angle lens, in particular, distortion, field curvature, etc. are favorably corrected.

Moreover, in an electronic camera etc., a technique is known to reduce size by collapsing respective lens groups toward image plane so that an air spacing in the lens system is reduced when the camera is carried. In the imaging lens of the present embodiment, for reduction in size upon carrying, the rearmost lens group may be desirably configured of two or less lenses so as to reduce the thickness on the optical axis.

Moreover, the lens group that travels to allow the imaging lens to come into focus may desirably include an aspherical surface. By correcting, with the use of the aspherical surface, the aberration caused by the traveling of the lens upon focusing, the aberration is favorably corrected independent of the shooting distance.

Moreover, the movable lens group may be desirably configured of two lens groups, and the two lens groups may desirably travel independently of each other upon focusing. In particular, variation in aberration upon focusing is large in a lens having large aperture ratio. Therefore, by adjusting a positional relationship between the two lens groups, the aberration is corrected, which leads to further improvement in performance. Moreover, each of the two lens groups may desirably have positive refractive power.

[Description on Conditional Expressions]

The imaging lens according to the present embodiment satisfies the following Conditional Expression (1).

$$-2 < ft/fr < -0.45 \qquad (1)$$

In above-described Conditional Expression (1), ft is a total focal length of the imaging lens in a condition that the imaging lens is in focus on an object at infinite, and fr is a focal length of the rearmost lens group.

Conditional Expression (1) is an expression that defines a ratio, that is preferable for reducing the size of the lens system, between the focal length of the rearmost lens group and the total focal length of the lens system. When a value of ft/fr is smaller than the lower limit in Conditional Expression (1), negative refractive power in the rearmost lens group is excessively strong, and the off-axial light ray enters an image pickup plane at a small angle. Therefore, shading is easily caused. When the value of ft/fr is larger than the upper limit in Conditional Expression (1), the negative refractive power in the rearmost lens group is weak. Therefore, reduction in the size of the optical system is difficult. Accordingly, by allowing the imaging lens to have the above-described configuration and to satisfy Conditional Expression (1), size reduction is achieved while achieving the half angle view covering a wide angle of about 30 degrees, the open F number around 2.0, and favorable optical performance. It is to be noted that, concerning Conditional Expression (1), the lower limit may be more preferably set to −1.5 and the upper limit may be more preferably set to −0.55 as shown in the following Conditional Expression (1)'.

$$-1.5 < ft/fr < -0.55 \qquad (1)'$$

In the imaging lens according to the present embodiment, further favorable performance is obtained by so optimizing the configuration of each lens as to satisfy at least one, and preferably, two or more in combination, of the following conditional expressions.

The imaging lens according to the present embodiment may desirably satisfy the following Conditional Expression (2). By satisfying the Conditional Expression (2), the negative refractive power in the rearmost lens group is appropriately set.

$$0.6 < fra/fr \leq 1 \qquad (2)$$

In the above-described Conditional Expression (2), fra is a focal length of the negative lens in the rearmost lens group.

Conditional Expression (2) is an expression that defines a ratio, that is preferable for obtaining a predetermined optical performance, between the focal length of the negative lens in the rearmost lens group and the focal length of the rearmost lens group. When a value of fra/fr is smaller than the lower limit in Conditional Expression (2), the negative refractive power in the rearmost lens group is excessively strong and the field curvature is excessively corrected. Therefore, higher performance is not achieved. In contrast, when the value of fra/fr is larger than the upper limit in Conditional Expression (2), the negative refractive power in the rearmost lens group is weak. Therefore, the image curvature is not sufficiently corrected. Accordingly, by allowing the imaging lens to satisfy Conditional Expression (2), the field curvature is favorably corrected. It is to be noted that, concerning Conditional Expression (2), the lower limit may be more preferably set to 0.65 as shown in the following Conditional Expression (2)'.

$$0.65 < fra/fr \leq 1 \qquad (2)'$$

Also, the imaging lens according to the present embodiment may desirably satisfy the following Conditional Expression (3). By satisfying Conditional Expression (3), a shape of the negative lens in the rearmost lens group is appropriately set. Therefore, the field curvature and the distortion are favorably corrected.

$$-2 < (R1+R2)/(R1-R2) < -0.5 \qquad (3)$$

In the above-described Conditional Expression (3), R1 is a curvature radius of an object-sided surface of the negative lens in the rearmost lens group, and R2 is a curvature radius of an image-sided surface of the negative lens in the rearmost lens group.

Conditional Expression (3) is an expression that defines the shape of the negative lens in the rearmost lens group that is preferable for favorably correcting the field curvature and the distortion. When a value of (R1+R2)/(R1−R2) is smaller than the lower limit in Conditional Expression (3), the curvature of the object-sided surface of the negative lens in the rearmost lens group is large, and the sag is deep. Therefore, the air spacing is not allowed to be sufficiently reduced upon collapsing. Accordingly, size reduction is not achieved. In contrast, when the value of (R1+R2)/(R1−R2) is larger than the upper limit in Conditional Expression (3), the curvature of the object-sided surface of the negative lens in the rearmost lens group is small. Therefore, the off-axial light ray enters the object-sided surface at a small angle. Accordingly, correction of the field curvature and the distortion is difficult. Accordingly, by allowing the imaging lens to satisfy Conditional Expression (3), the field curvature is favorably corrected. It is to be noted that, concerning Conditional Expression (3), the lower limit may be more preferably set to −1.8 and the upper limit may be more preferably set to −0.8 as shown in the following Conditional Expression (3)'.

$$-1.8 < (R1+R2)/(R1-R2) < -0.8 \qquad (3)'$$

Also, the imaging lens according to the present embodiment may desirably satisfy the following Conditional Expression (4). By allowing the imaging lens to satisfy Conditional Expression (4), the rearmost lens group is arranged on the image plane side, which contributes to correction of the off-axial aberration and to size reduction upon collapsing.

$$0.2 < Lr/Y < 1 \qquad (4)$$

In the above-described Conditional Expression (4), Lr is a distance along an optical axis from a most-object-sided surface in the rearmost lens group to the image plane, and Y is a maximum image height along the image plane.

Conditional Expression (4) is an expression that defines a position of the rearmost lens group. When a value of Lr/Y is smaller than the lower limit in Conditional Expression (4), a low-pass filter, an infrared cut filter, etc. that are typically arranged between the lens system and an image pickup device are not allowed to be arranged therebetween. In contrast, when the value of Lr/Y is larger than the upper limit in Conditional Expression (4), the rearmost lens group is arranged away from the image pickup plane, which reduces the effect to separate the positions in the lens surface that the central light ray in the screen and the off-axial light ray pass. Therefore, correction of the off-axial aberration is difficult and the size reduction upon collapsing is prevented. Accordingly, by satisfying Conditional Expression (4), the correction of the off-axial aberration and the size reduction upon collapsing are achieved. It is to be noted that, concerning Conditional Expression (4), the lower limit may be more preferably set to 0.25 and the upper limit may be more preferably set to 0.65 as shown in the following Conditional Expression (4)'.

$$0.25 < Lr/Y < 0.65 \tag{4}'$$

The imaging lens according to the present embodiment may preferably satisfy the following Conditional Expression (5). By allowing the imaging lens to satisfy Conditional Expression (5), size reduction upon collapsing is achieved.

$$0.5 < TD/Y < 1.4 \tag{5}$$

In the above-described Conditional Expression (5), TD is a total thickness along the optical axis of all lenses included in the imaging lens.

Conditional Expression (5) is an expression that defines the total thickness along the optical axis of all lenses included in the lens system. When a value of TD/Y is smaller than the lower limit in Conditional Expression (5), the necessary number of lenses for achieving high performance is not secured. In contrast, when the value of TD/Y is larger than the upper limit in Conditional Expression (5), size reduction upon collapsing is prevented. Accordingly, by allowing the imaging lens to satisfy Conditional Expression (5), size reduction upon collapsing is achieved. It is to be noted that, concerning Conditional Expression (5), the lower limit may be more preferably set to 0.65 and the upper limit may be more preferably set to 1.2 as shown in the following Conditional Expression (5)'.

$$0.65 < TD/Y < 1.2 \tag{5}'$$

The imaging lens according to the present embodiment may desirably satisfy the following Conditional Expression (6). By satisfying Conditional Expression (6), size reduction upon shooting is achieved.

$$2.0 < TL/Y < 3.5 \tag{6}$$

In the above-described Conditional Expression (6), TL is a maximum total length, along an optical axis, of the imaging lens.

Conditional Expression (6) is an expression that defines the total length of the lens system. When a value of TL/Y is smaller than the lower limit in Conditional Expression (6), it is necessary to allow the refractive power of each lens to be excessively large and to allow the total length of the lens system to be short. Therefore, optical performance is degraded more due to manufacturing error. In contrast, when the value of TL/Y is larger than the upper limit in Conditional Expression (6), the total optical length is long, which prevents size reduction upon shooting. Accordingly, by allowing the imaging lens to satisfy Conditional Expression (6), size reduction upon shooting is achieved. It is to be noted that, concerning Conditional Expression (6), the lower limit may be more preferably set to 2.3 and the upper limit may be more preferably set to 3.2 as shown in the following Conditional Expression (6)'.

$$2.3 < TL/Y < 3.2 \tag{6}'$$

As described above, according to the present embodiment, the refractive power arrangement in the whole lens is optimized and the lens configuration of each lens group is optimized. Therefore, size reduction is achieved while achieving wide angle, large aperture ratio, and favorable optical performance.

[Example of Application to Image Pickup Apparatus]

Figure 17:
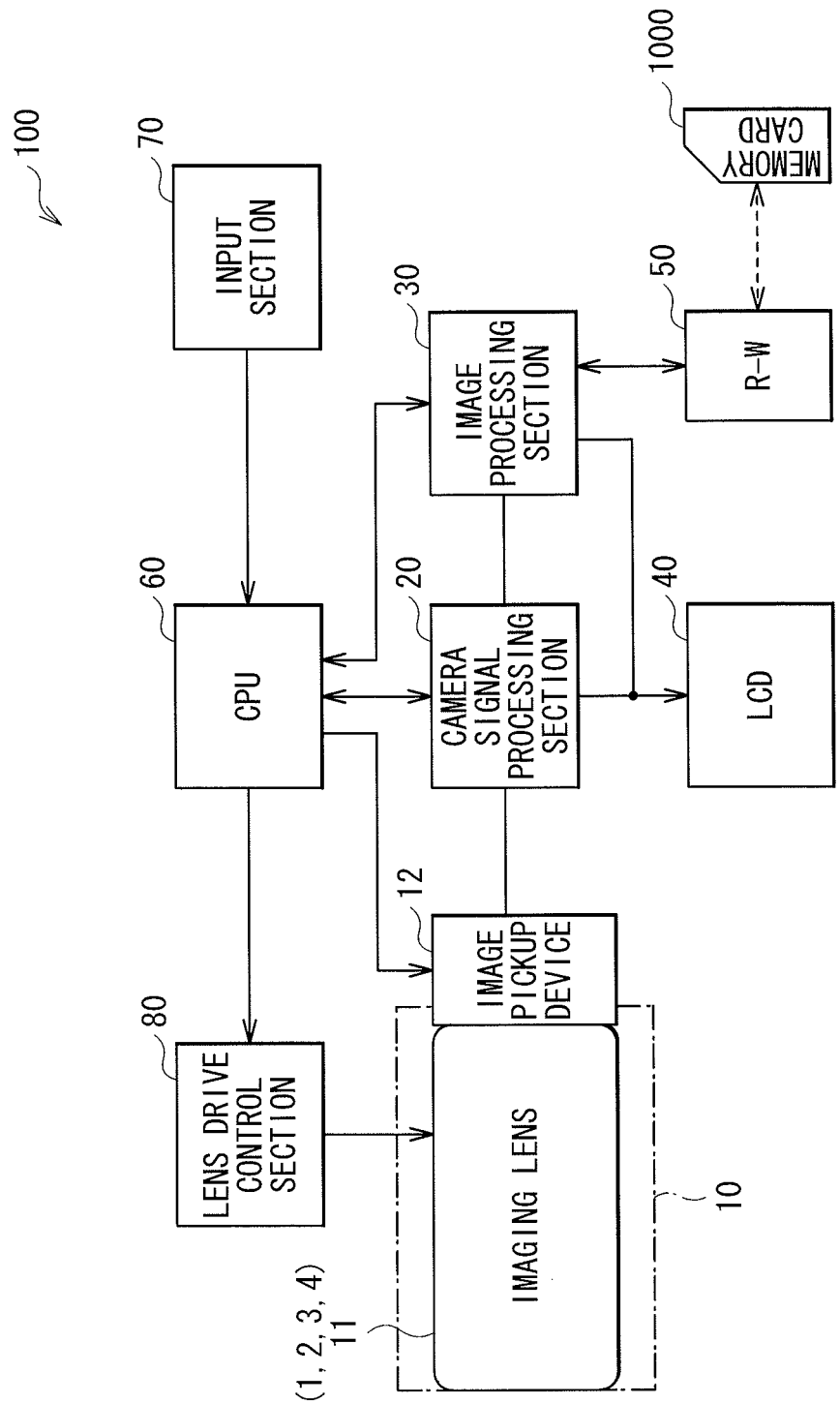
FIG. 17 is a block diagram illustrating a configuration example of an image pickup apparatus.

FIG. 17 illustrates a configuration example of an image pickup apparatus 100 to which the imaging lens according to the present embodiment is applied. The image pickup apparatus 100 may be, for example, a digital still camera, and may include a camera block 10, a camera signal processing section 20, an image processing section 30, an LCD (Liquid Crystal Display) 40, an R-W (reader-writer) 50, a CPU (Central Processing Unit) 60, an input section 70, and a lens drive control section 80.

The camera block 10 has an image pickup function, and includes an optical system that includes an imaging lens 11 (imaging lens 1, 2, 3, or 4) as an image pickup lens, and an image pickup device 12 such as a CCD (Charge Coupled Device) and a CMOS (Complementary Metal Oxide Semiconductor). The image pickup device 12 converts an optical image formed by the imaging lens 11 to an electric signal, and thereby, outputs the image pickup signal (image signal) based on the optical image.

The camera signal processing section 20 performs, on the image signal supplied from the image pick up device 12, various kinds of signal processing such as analog-digital conversion, denoising, image quality correction, and conversion to luminance-color-difference signal.

The image processing section 30 performs recording and reproducing processing on the image signal. Specifically, the image processing section 30 may perform, for example, compression coding and expansion decoding processing on the image signal based on a predetermined image data format, conversion processing on data specification such as resolution, etc.

The LCD 40 has a function of displaying various data such as an operation state of a user with respect to the input section 70 and an shot image. The R-W 50 writes the image data coded by the image processing section 30 into a memory card 1000 and reads the image data recorded in the memory card 1000. The memory card 1000 may be, for example, a semiconductor memory that is attachable to and detachable from a slot connected to the R-W 50.

The CPU 60 serves as a control processing section that controls each circuit block provided in the image pickup apparatus 100. The CPU 60 may control each circuit block based on, for example, instruction input signal from the input section 70 etc. The input section 70 may be configured, for example, of various switches with which necessary operation is performed by the user and the like. The input section 70 may be configured, for example, of a shutter release button for performing shutter operation, a selection switch for selecting operation modes, etc. and outputs the instruction input signal according to the user's operation to the CPU 60. The lens drive control section 80 controls drive of the lens arranged in the camera block 10, and controls components such as an unillustrated motor that drives each lens in the imaging lens 11 based on the control signal from the CPU 60.

Description will be given below of operation in the image pickup apparatus 100. In a standby state for shooting, under control of the CPU 60, the image signal shot in the camera block 10 is outputted to the LCD 40 through the camera signal processing section 20 and is displayed as a camera-through image. Further, for example, when the instruction input signal for focusing is inputted from the input section 70 to the CPU 60, the CPU 60 outputs the control signal to the lens drive control section 80, and a predetermined lens in the imaging lens 11 travels based on the control of the lens drive control section 80.

When an unillustrated shutter in the camera block 10 operates according to the instruction input signal from the input section 70, the shot image signal is outputted from the camera signal processing section 20 to the image processing section 30, is compression coded, and is converted into digital data having a predetermined data format. The converted data is outputted to the R-W 50 and is written into the memory card 1000.

It is to be noted that, for example, when the shutter release button in the input section 70 is pressed half way, when the shutter release button is pressed all the way for recording (shooting), etc., the lens drive control section 80 allows the predetermined lens in the imaging lens 11 to travel based on the control signal from the CPU 60, and thereby, the focusing is performed.

Upon reproducing the image data recorded in the memory card 1000, the R-W 50 reads a predetermined image data from the memory card 1000 according to the operation with respect to the input section 70, and the image processing section 30 performs the extension decoding processing on the predetermined image data. Thereafter, a reproduction image signal is outputted to the LCD 40 and the reproduced image is displayed thereon.

It is to be noted that, in the above-described embodiment, an example in which the image pickup apparatus is applied to the digital still camera is described. However, a range of application of the image pickup apparatus is not limited to a digital still camera, and specific applications of the image pickup apparatus 100 may include various other electronic apparatuses. For example, various other electronic apparatuses such as a lens interchangeable camera, a digital video camera, a mobile phone in which a digital video camera or the like is assembled, and a PDA (Personal Digital Assistant) may be the specific applications of the image pickup apparatus 100 without limitation.

[4. Numerical Examples of Lens]

Next, description will be given of specific numerical examples of the imaging lens according to the present embodiment. Symbols etc. in the tables and the description below represent the following. "Surface number" represents the number of an i-th surface where a surface of a most-object-sided component is counted as a 1st surface, and numerals are sequentially attached to surfaces of the components so that the numeral becomes larger as the surface of the component become closer to the image plane. "ri" represents a value (mm) of a paraxial curvature radius of the i-th surface. "Di" represents a value (mm) of a spacing along the optical axis between the i-th surface and the (i+1)th surface. "Ni" represents a value of a refractive index of the d line (with wavelength of 587.6 nm) of a material of an optical component that has the i-th surface. "vi" represents a value of an Abbe number of the d line of the material of the optical component that has the i-th surface. The value "0" in "curvature radius" indicates a planar surface or an aperture stop surface.

Some lenses used in the respective numerical examples has a lens surface which is formed as an aspherical surface. A shape of the aspherical surface is defined by the following expression for the aspherical surface, where "x" is a distance (sag amount) from the vertex of the lens surface along the optical axis, "y" is a height (image height) in a direction perpendicular to the optical axis, "c" is a paraxial curvature (reciprocal of curvature radius) at the vertex of the lens, "K" is a conic constant, and "A", "B", "C", and "D" are aspherical surface coefficients of 4th order, 6th order, 8th order, and 10th order, respectively. In respective tables showing the aspherical surface coefficients which will be described later, "E-i" is an exponential expression having 10 as a base. In other words, "E-i" indicates "$10^{-i}$". To give an example, "0.12345E-05" represents "$0.12345 \times 10^{-5}$".

(Expression for Aspherical Surface)

$$x = cy^2/(1+(1-(1+K)c^2y^2)^{1/2}) + Ay^4 + By^6 + \ldots$$

[Numerical Example 1]

Tables 1 to 4 show a specific numerical example corresponding to the imaging lens 1 according to the first configuration example shown in FIG. 1. In particular, Table 1 shows basic lens data thereof and Table 2 shows data on aspherical surfaces. Tables 3 and 4 show other data.

The imaging lens 1 includes a first lens group GR1 having positive refractive power, a second lens group GR2 having positive refractive power, and a third lens group GR3 having negative refractive power that are arranged in order from the object plane toward the image plane. The first lens group GR1 includes a first lens G1 and a second lens G2 that are arranged in order from the object plane toward the image plane. The first lens G1 is configured of a meniscus-shaped negative lens that has a convex surface facing toward the object plane. The second lens G2 is configured of a meniscus-shaped positive lens that has a convex surface facing toward the object plane. The second lens group GR2 includes a cemented lens in which a third lens G3 and a fourth lens G4 are cemented to each other and a fifth lens G5 that are arranged in order from the object plane toward the image plane. The third lens G3 is configured of a negative lens having a biconcave shape. The fourth lens G4 is configured of a positive lens having a biconvex shape. The fifth lens G5 is a meniscus-shaped positive lens having a convex surface facing toward the image plane. The third lens group GR3 includes a sixth lens G6 that is configured of a meniscus-shaped negative lens having a concave surface toward the object plane. A filter FL is arranged between the third lens group GR3 and the image plane IMG. An aperture stop S is arranged in the vicinity of the first lens group GR1 on the image plane side, and travels together with the first lens group GR1 upon focusing. Upon focusing, the first lens group GR1 and the second lens group GR2 serve as the movable lens groups.

In Numerical Example 1, both surface (the third surface and the fourth surface) of the positive lens (G2) in the first lens group GR1, an image-sided surface (the eighth surface) of the positive lens (G4) in the second lens group GR2, and an object-sided surface (the eleventh surface) of the negative lens (G6) in the third lens group GR3 are aspherical surfaces. Values of the 4th-order, 6th-order, 8th-order, and 10th-order aspherical surface coefficients A, B, C, and D of the aspherical surface in Numerical Example 1 are shown together with values of the conic constant K in Table 2.

Table 3 shows values of a focal length f, F-number Fno, and a half angle of view ω in each of the state that the imaging lens is in focus on an object at infinite, the state that the imaging lens is in focus on an object at the intermediate distance, and the state that the imaging lens is in focus on an object at the shortest distance.

In Numerical Example 1, upon focusing from the infinite state to the shortest-distance state, a surface spacing D5 between the first lens group GR1 and the second lens group GR2 and a surface spacing D10 between the second lens group GR2 and the third lens group GR3 are varied. Table 4 shows values of shooting magnification and variable spacings in each of the state that the imaging lens is in focus on an object at infinite, the state that the imaging lens is in focus on an object at the intermediate distance, and the state that the imaging lens is in focus on an object at the shortest distance.

TABLE 1

Example 1

| lens group | surface number | ri | Di | Ni | vi |
|---|---|---|---|---|---|
| GR1 | 1 | 271.685 | 1.00 | 1.6990 | 30.05 |
| | 2 | 33.479 | 2.40 | | |
| | 3 | 21.515 | 3.58 | 1.8513 | 40.10 |
| | 4 | 219.697 | 2.22 | | |
| (aperture stop) | 5 | 0.000 | (D5) | | |
| GR2 | 6 | −15.318 | 1.00 | 1.7521 | 25.05 |
| | 7 | 44.871 | 4.40 | 1.8513 | 40.10 |
| | 8 | −36.042 | 0.77 | | |
| | 9 | −6000.000 | 5.25 | 1.8810 | 40.14 |
| | 10 | −24.628 | (D10) | | |
| GR3 | 11 | −25.275 | 1.50 | 1.5891 | 61.25 |
| | 12 | −98.773 | 1.78 | | |
| FL | 13 | 0.000 | 1.92 | 1.5168 | 64.20 |
| | 14 | 0.000 | 0.19 | | |
| | 15 | 0.000 | 0.70 | 1.5168 | 64.20 |
| | 16 | 0.000 | 0.92 | | |

TABLE 2

Example 1 · aspherical surface data

| surface number | K | A | B | C | D |
|---|---|---|---|---|---|
| 3 | 0.0000E+00 | 6.2090E−06 | 1.5232E−08 | −5.3849E−11 | 0.0000E+00 |
| 4 | 0.0000E+00 | 2.0748E−05 | 5.1765E−08 | −5.3288E−11 | 0.0000E+00 |
| 8 | 0.0000E+00 | 1.4057E−05 | 1.0306E−08 | 1.6020E−11 | 0.0000E+00 |
| 11 | 0.0000E+00 | 0.0000E+00 | 0.0000E+00 | 0.0000E+00 | 0.0000E+00 |

TABLE 3

Example 1

| | infinite | intermediate distance | shortest distance |
|---|---|---|---|
| f | 36.05 | 35.22 | 32.23 |
| Fno | 2.04 | 2.06 | 2.19 |
| ω | 30.97 | 30.67 | 29.29 |

TABLE 4

Example 1

| | infinite | intermediate distance | shortest distance |
|---|---|---|---|
| shooting magnification | — | 0.04 | 0.19 |
| D5 | 11.59 | 11.38 | 10.80 |
| D10 | 20.16 | 21.31 | 26.02 |

Figure 2:
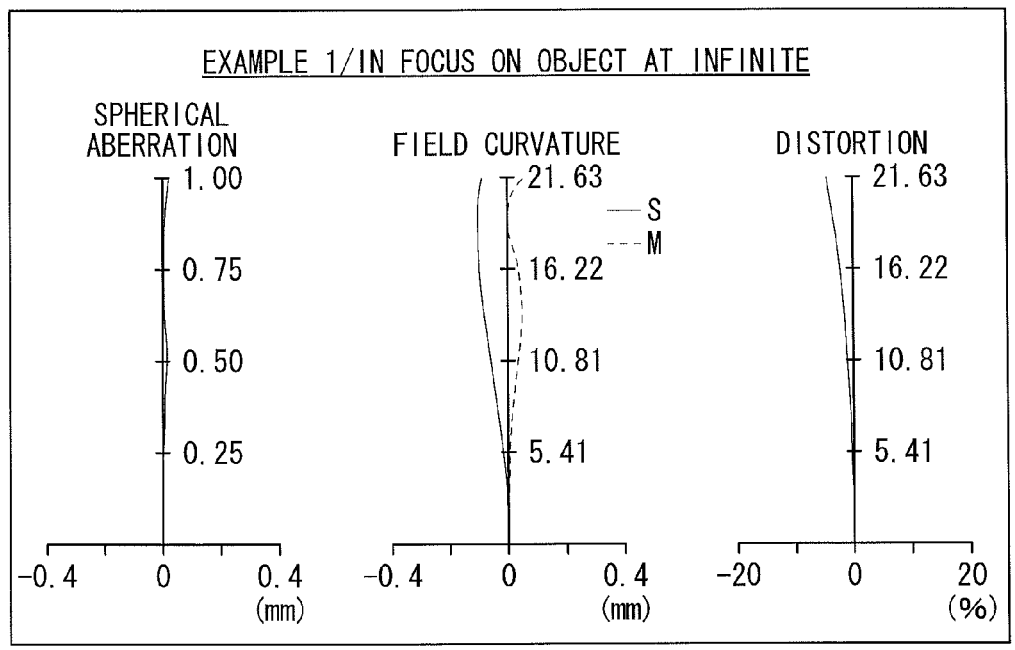
FIG. 2 is an aberration diagram illustrating spherical aberration, field curvature, and distortion of an imaging lens corresponding to Numerical Example 1 in a state that the imaging lens is in focus on an object at infinite.
Figure 3:
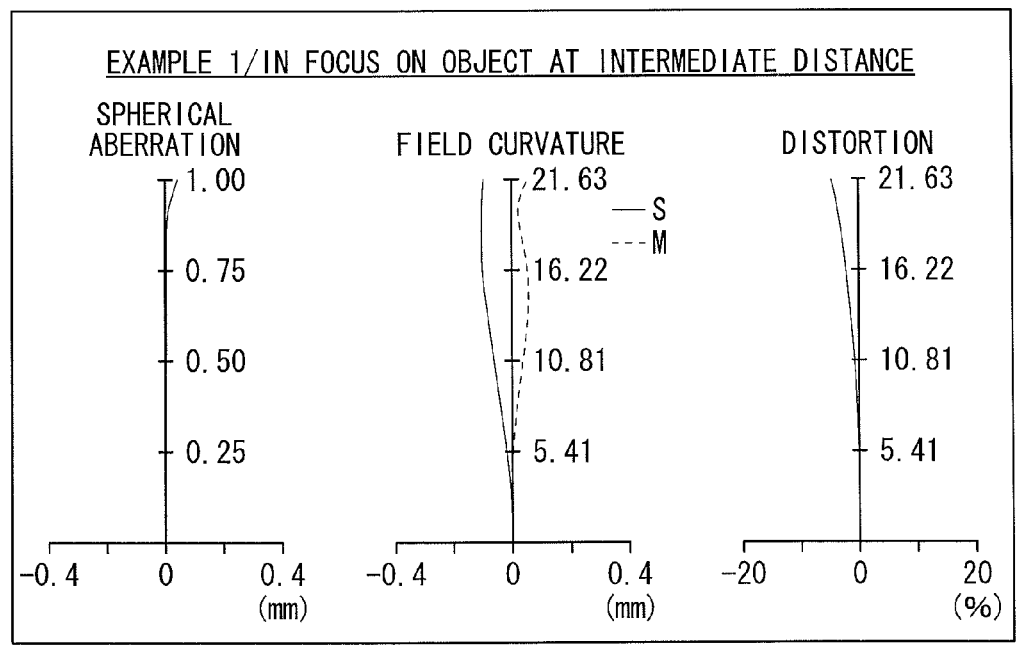
FIG. 3 is an aberration diagram illustrating spherical aberration, field curvature, and distortion of the imaging lens corresponding to Numerical Example 1 in a state that the imaging lens is in focus on an object at an intermediate distance.
Figure 4:
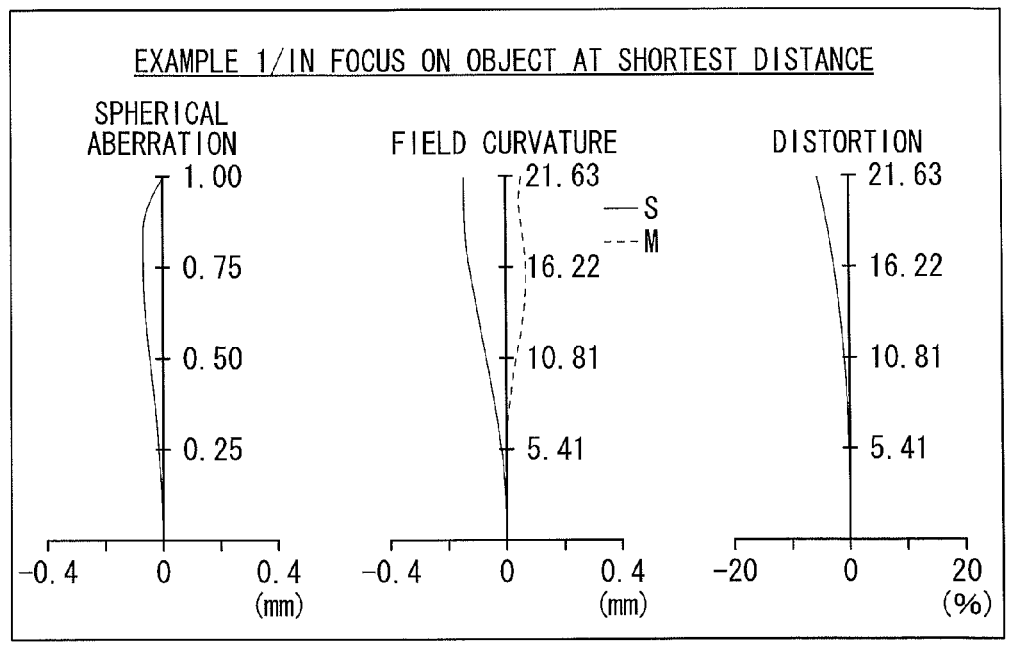
FIG. 4 is an aberration diagram illustrating spherical aberration, field curvature, and distortion of the imaging lens corresponding to Numerical Example 1 in a state that the imaging lens is in focus on an object at a shortest distance.

Aberration performance of the imaging lens 1 corresponding to the above-described Numerical Example 1 is shown in FIGS. 2 to 4. FIG. 2 illustrates aberration in the state that the imaging lens is in focus on an object at infinite. FIG. 3 illustrates aberration in the state that the imaging lens is in focus on an object at the intermediate distance. FIG. 4 illustrates aberration in the state that the imaging lens is in focus on an object at the shortest distance.

FIGS. 2 to 4 illustrate spherical aberration, astigmatism (field curvature), and distortion, as aberration diagrams. In each aberration diagram, aberration is shown with the d line (587.6 nm) as the reference wavelength. In the aberration diagram showing the field curvature, a solid line (S) shows aberration in a sagittal image plane and a dashed line (M) shows aberration in a meridional image plane.

As can be clearly seen from the respective aberration diagrams described above, various kinds of aberration are favorably corrected and superior imaging performance is achieved.

[Numerical Example 2]

Tables 5 to 8 show a specific numerical example corresponding to the imaging lens 2 according to the second configuration example shown in FIG. 5. In particular, Table 5 shows basic lens data thereof and Table 6 shows data on aspherical surfaces. Tables 7 and 8 show other data.

The imaging lens 2 includes a first lens group GR1 having negative refractive power, a second lens group GR2 having positive refractive power, a third lens group GR3 having positive refractive power, and a fourth lens group GR4 having negative refractive power that are arranged in order from the object plane toward the image plane. The first lens group GR1 includes a first lens G1 that is configured of a meniscus-shaped negative lens that has a concave surface facing toward the object plane. The second lens group GR2 includes a second lens G2 that is configured of a meniscus-shaped positive lens that has a convex surface facing toward the object plane. The third lens group GR3 includes a cemented lens in which a third lens G3 and a fourth lens G4 are cemented to each other and a fifth lens G5 that are arranged in order from the object plane toward the image plane. The third lens G3 is a negative lens having a biconcave shape. The fourth lens G4 is a positive lens having a biconvex shape. The fifth lens G5 is configured of a positive lens having a biconvex shape. The fourth lens group GR4 includes a sixth lens G6 and a seventh lens G7 that are arranged in order from the object plane toward the image plane. The sixth lens G6 is configured of a meniscus-shaped negative lens having a concave surface facing toward the object plane. The seventh lens G7 is configured of a positive lens having a plano-convex shape having a convex surface facing toward the object plane. The filter FL is arranged between the fourth lens group GR4 and the image plane IMG. The aperture stop S is arranged in the vicinity of the second lens group GR2 on the image plane side, and travels together with the second lens group GR2 upon focusing. Upon focusing, the second lens group GR2 and the third lens group GR3 serve as the movable lens groups.

In Numerical Example 2, both surface (the first surface and the second surface) of the negative lens (G1) in the first lens group GR1, both surface (the third surface and the fourth surface) of the positive lens (G2) in the second lens group GR2, an image-sided surface (the eighth surface) of the positive lens (G4) in the third lens group GR3, and both surfaces (the eleventh surface and the twelfth surface) of the negative lens (G6) in the fourth lens group GR4 are aspherical surfaces. Values of the 4th-order, 6th-order, 8th-order, and 10th-order aspherical surface coefficients A, B, C, and D of the aspherical surface in Numerical Example 2 are shown together with values of the conic constant K in Table 6.

Table 7 shows values of a focal length f, F-number Fno, and a half angle of view ω in each of the state that the imaging lens is in focus on an object at infinite, the state that the imaging lens is in focus on an object at the intermediate distance, and the state that the imaging lens is in focus on an object at the shortest distance.

In Numerical Example 2, upon focusing from the infinite state to the shortest-distance state, a surface spacing D2 between the first lens group GR1 and the second lens group GR2, a surface spacing D5 between the second lens group GR2 and the third lens group GR3, and a surface spacing D10 between the third lens group GR3 and the fourth lens group GR4 are varied. Table 8 shows values of shooting magnification and variable spacings in each of the state that the imaging lens is in focus on an object at infinite, the state that the imaging lens is in focus on an object at the intermediate distance, and the state that the imaging lens is in focus on an object at the shortest distance.

TABLE 5

Example 2

| lens group | surface number | ri | Di | Ni | vi |
|---|---|---|---|---|---|
| GR1 | 1 | −87.002 | 1.00 | 1.9229 | 20.88 |
|  | 2 | −180.188 | (D2) |  |  |

TABLE 5-continued

Example 2

| lens group | surface number | ri | Di | Ni | vi |
|---|---|---|---|---|---|
| GR2 | 3 | 18.246 | 3.67 | 1.8820 | 37.22 |
|  | 4 | 72.439 | 2.00 |  |  |
| (aperture stop) | 5 | 0.000 | (D5) |  |  |
| GR3 | 6 | −17.741 | 1.00 | 1.9229 | 20.88 |
|  | 7 | 23.336 | 4.10 | 1.8820 | 37.22 |
|  | 8 | −38.862 | 1.85 |  |  |
|  | 9 | 112.158 | 5.00 | 2.0007 | 25.46 |
|  | 10 | −33.740 | (D10) |  |  |
| GR4 | 11 | −14.286 | 1.50 | 1.6226 | 58.16 |
|  | 12 | −174.431 | 0.50 |  |  |
|  | 13 | 86.402 | 3.63 | 1.8810 | 40.14 |
|  | 14 | 0.000 | 1.00 |  |  |
| FL | 15 | 0.000 | 2.44 | 1.5168 | 64.20 |
|  | 16 | 0.000 | 0.42 |  |  |
|  | 17 | 0.000 | 0.70 | 1.5168 | 64.20 |
|  | 18 | 0.000 | 0.92 |  |  |

TABLE 6

Example 2 · aspherical surface data

| surface number | K | A | B | C | D |
|---|---|---|---|---|---|
| 1 | 0.0000E+00 | −2.0084E−05 | 2.1862E−07 | −7.8531E−10 | 1.2168E−12 |
| 2 | 4.2251E+00 | −1.8511E−05 | 2.2781E−07 | −8.4318E−10 | 1.3924E−12 |
| 3 | 3.0572E−01 | 9.1755E−06 | 1.0756E−07 | −4.1088E−10 | 6.2896E−12 |
| 4 | 9.8987E+00 | 1.2803E−05 | 3.9281E−08 | 0.0000E+00 | 0.0000E+00 |
| 8 | −5.4041E+00 | 1.8822E−05 | 8.1307E−08 | 1.0785E−09 | 0.0000E+00 |
| 11 | −1.1725E+00 | 7.6611E−06 | −2.1458E−07 | 1.4280E−09 | −2.1461E−12 |
| 12 | 1.0084E−09 | −6.8997E−07 | −8.8719E−08 | 3.6460E−10 | −3.2214E−13 |

TABLE 7

Example 2

|  | infinite | intermediate distance | shortest distance |
|---|---|---|---|
| f | 34.13 | 33.33 | 31.04 |
| Fno | 2.05 | 2.08 | 2.21 |
| ω | 32.37 | 31.81 | 30.02 |

TABLE 8

Example 2

|  | infinite | intermediate distance | shortest distance |
|---|---|---|---|
| shooting magnification | — | 0.03 | 0.15 |
| D2 | 5.17 | 4.42 | 1.99 |
| D5 | 6.13 | 6.05 | 5.87 |
| D10 | 10.89 | 11.71 | 14.34 |

Figure 6:
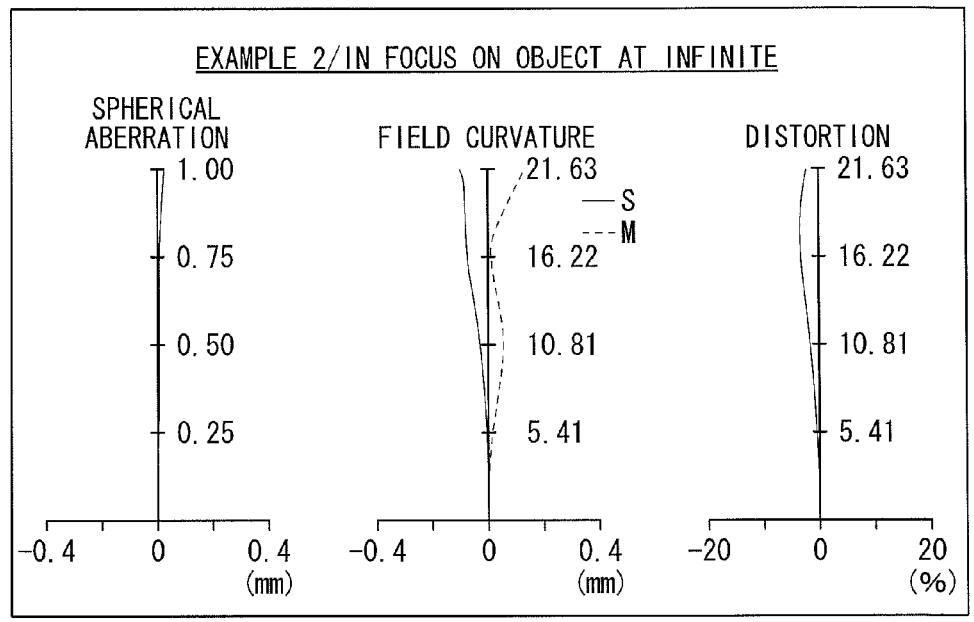
FIG. 6 is an aberration diagram illustrating spherical aberration, field curvature, and distortion of an imaging lens corresponding to Numerical Example 2 in a state that the imaging lens is in focus on an object at infinite.
Figure 7:
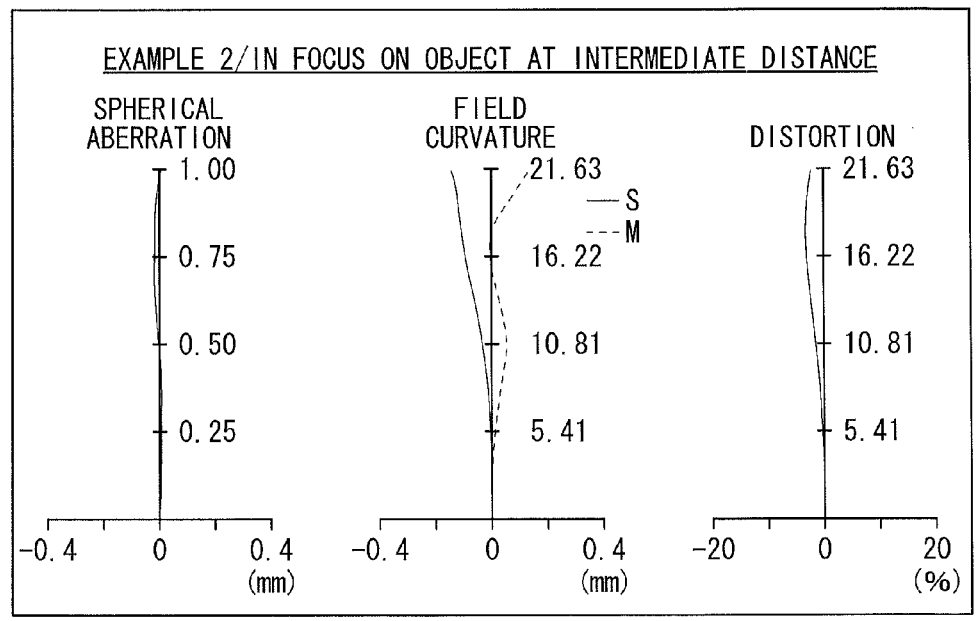
FIG. 7 is an aberration diagram illustrating spherical aberration, field curvature, and distortion of the imaging lens corresponding to Numerical Example 2 in a state that the imaging lens is in focus on an object at an intermediate distance.
Figure 8:
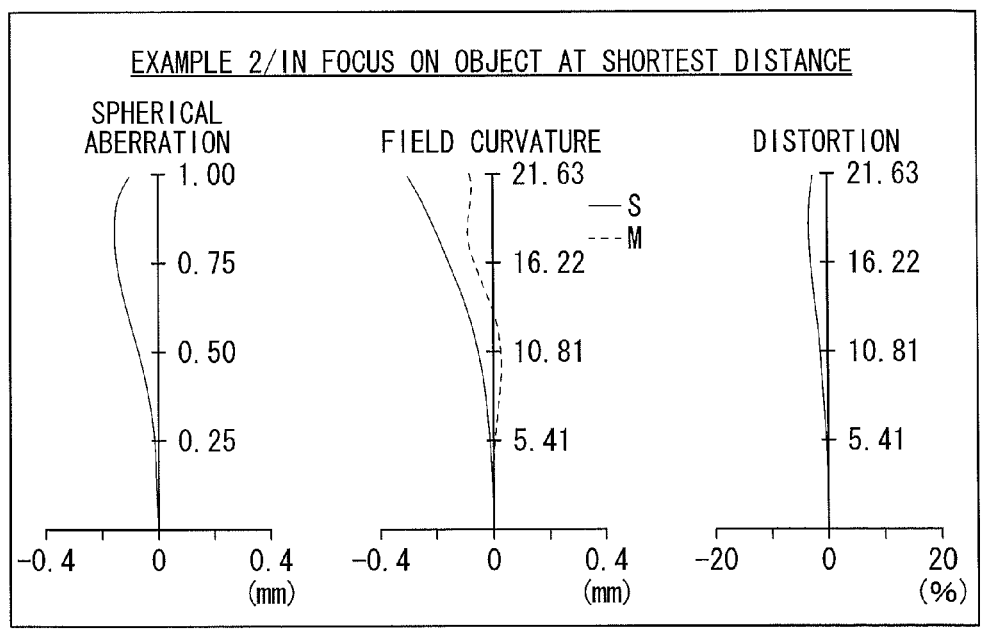
FIG. 8 is an aberration diagram illustrating spherical aberration, field curvature, and distortion of the imaging lens corresponding to Numerical Example 2 in a state that the imaging lens is in focus on an object at a shortest distance.

Aberration performance of the imaging lens 2 corresponding to the above-described Numerical Example 2 is shown in FIGS. 6 to 8. FIG. 6 illustrates aberration in the state that the imaging lens is in focus on an object at infinite. FIG. 7 illustrates aberration in the state that the imaging lens is in focus on an object at the intermediate distance. FIG. 8 illustrates aberration in the state that the imaging lens is in focus on an object at the shortest distance.

FIGS. 6 to 8 illustrate spherical aberration, astigmatism (field curvature), and distortion, as aberration diagrams. In each aberration diagram, aberration is shown with the d line (587.6 nm) as the reference wavelength. In the aberration diagram showing the field curvature, a solid line (S) shows aberration in a sagittal image plane and a dashed line (M) shows aberration in a meridional image plane.

As can be clearly seen from the respective aberration diagrams described above, various kinds of aberration are favorably corrected and superior imaging performance is achieved.

[Numerical Example 3]

Tables 9 to 12 show a specific numerical example corresponding to the imaging lens 3 according to the third configuration example shown in FIG. 9. In particular, Table 9 shows basic lens data thereof and Table 10 shows data on aspherical surfaces. Tables 11 and 12 show other data.

The imaging lens 3 includes a first lens group GR1 having positive refractive power, a second lens group GR2 having positive refractive power, a third lens group GR3 having positive refractive power, and a fourth lens group GR4 having negative refractive power that are arranged in order from the object plane toward the image plane. The first lens group GR1 includes a first lens G1 that is configured of a meniscus-shaped positive lens that has a convex surface facing toward the object plane. The second lens group GR2 includes a second lens G2 and a third lens G3 that are arranged in order from the object plane toward the image plane. The second lens G2 is configured of a negative lens having a biconcave shape. The third lens G3 is configured of a positive lens having a biconvex shape. The third lens group GR3 includes a cemented lens in which a fourth lens G4 and a fifth lens G5 are cemented to each other and a sixth lens G6 that are arranged in order from the object plane toward the image plane. The fourth lens G4 is a negative lens having a biconcave shape. The fifth lens G5 is a positive lens having a biconvex shape. The sixth lens G6 is configured of a positive lens having a biconvex shape. The fourth lens group GR4 includes a seventh lens G7 and an eighth lens G8 that are arranged in order from the object plane toward the image plane. The seventh lens G7 is configured of a meniscus-shaped negative lens having a concave surface facing toward the object plane. The eighth lens G8 is configured of a positive lens of a plano-convex shape having a convex surface facing toward the object plane. The filter FL is arranged between the fourth lens group GR4 and the image plane IMG. The aperture stop S is arranged in the vicinity of the second lens group GR2 on the image plane side, and travels together with the second lens group GR2 upon focusing. Upon focusing, the second lens group GR2 and the third lens group GR3 serve as the movable lens groups.

In Numerical Example 3, an image-sided surface (the second surface) of the negative lens (G1) in the first lens group GR1, both surfaces (the fifth surface and the sixth surface) of the positive lens (G3) in the second lens group GR2, an image-sided surface (the tenth surface) of the positive lens (G5) in the third lens group GR3, and both surfaces (the thirteenth surface and the fourteenth surface) of the negative lens (G7) in the fourth lens group GR4 are aspherical surfaces. Values of the 4th-order, 6th-order, 8th-order, and 10th-order aspherical surface coefficients A, B, C, and D of the aspherical surface in Numerical Example 3 are shown together with values of the conic constant K in Table 10.

Table 11 shows values of a focal length f, F-number Fno, and a half angle of view ω in each of the state that the imaging lens is in focus on an object at infinite, the state that the imaging lens is in focus on an object at the intermediate distance, and the state that the imaging lens is in focus on an object at the shortest distance.

In Numerical Example 3, upon focusing from the infinite state to the shortest-distance state, a surface spacing D2 between the first lens group GR1 and the second lens group GR2, a surface spacing D7 between the second lens group GR2 and the third lens group GR3, a surface spacing D12 between the third lens group GR3 and the fourth lens group GR4 are varied. Table 12 shows values of shooting magnification and variable spacings in each of the state that the imaging lens is in focus on an object at infinite, the state that the imaging lens is in focus on an object at the intermediate distance, and the state that the imaging lens is in focus on an object at the shortest distance.

TABLE 9

| Example 3 | | | | | |
|---|---|---|---|---|---|
| lens group | surface number | ri | Di | Ni | vi |
| GR1 | 1 | 47.455 | 2.01 | 1.5831 | 59.46 |
|  | 2 | 64.682 | (D2) |  |  |
| GR2 | 3 | −167.506 | 1.00 | 1.8467 | 23.78 |
|  | 4 | 58.796 | 0.50 |  |  |
|  | 5 | 19.856 | 3.77 | 1.8820 | 37.22 |
|  | 6 | −938.234 | 2.00 |  |  |
| (aperture stop) | 7 | 0.000 | (D7) |  |  |
| GR3 | 8 | −16.026 | 1.00 | 1.9229 | 20.88 |
|  | 9 | 75.768 | 3.74 | 1.8820 | 37.22 |
|  | 10 | −31.071 | 0.50 |  |  |
|  | 11 | 536.216 | 5.00 | 2.0010 | 29.13 |
|  | 12 | −26.972 | (D12) |  |  |
| GR4 | 13 | −12.981 | 1.50 | 1.5831 | 59.46 |
|  | 14 | −87.788 | 0.50 |  |  |
|  | 15 | 105.471 | 3.22 | 1.8810 | 40.14 |
|  | 16 | 0.000 | 1.00 |  |  |
| FL | 17 | 0.000 | 2.44 | 1.5168 | 64.20 |
|  | 18 | 0.000 | 0.42 |  |  |
|  | 19 | 0.000 | 0.70 | 1.5168 | 64.20 |
|  | 20 | 0.000 | 0.92 |  |  |

TABLE 10

| Example 3 · aspherical surface data | | | | | |
|---|---|---|---|---|---|
| surface number | K | A | B | C | D |
| 2 | 2.4487E+00 | 1.1974E−06 | 5.5163E−09 | −1.6265E−11 | 0.0000E+00 |
| 5 | 4.2393E−01 | −2.6921E−06 | 3.8837E−08 | −2.0629E−10 | 1.7513E−12 |
| 6 | −4.2666E+01 | 1.1957E−05 | 2.7489E−08 | 0.0000E+00 | 0.0000E+00 |
| 10 | −6.9063E+00 | −5.2982E−06 | 1.1880E−07 | 2.7451E−10 | 0.0000E+00 |
| 13 | −1.1547E+00 | 5.2972E−05 | −4.7953E−07 | 1.3457E−09 | −1.1273E−12 |
| 14 | 1.7675E+01 | 3.3023E−05 | −2.1058E−07 | 3.7202E−10 | −1.3009E−13 |

TABLE 11

Example 3

|  | infinite | intermediate distance | shortest distance |
|---|---|---|---|
| f | 36.04 | 34.83 | 31.59 |
| Fno | 2.06 | 2.09 | 2.19 |
| ω | 30.97 | 30.61 | 29.57 |

TABLE 12

Example 3

|  | infinite | intermediate distance | shortest distance |
|---|---|---|---|
| shooting magnification | — | 0.04 | 0.15 |
| D2 | 6.88 | 6.11 | 3.78 |
| D7 | 8.13 | 7.99 | 7.57 |
| D12 | 11.69 | 12.61 | 15.36 |

Figure 10:
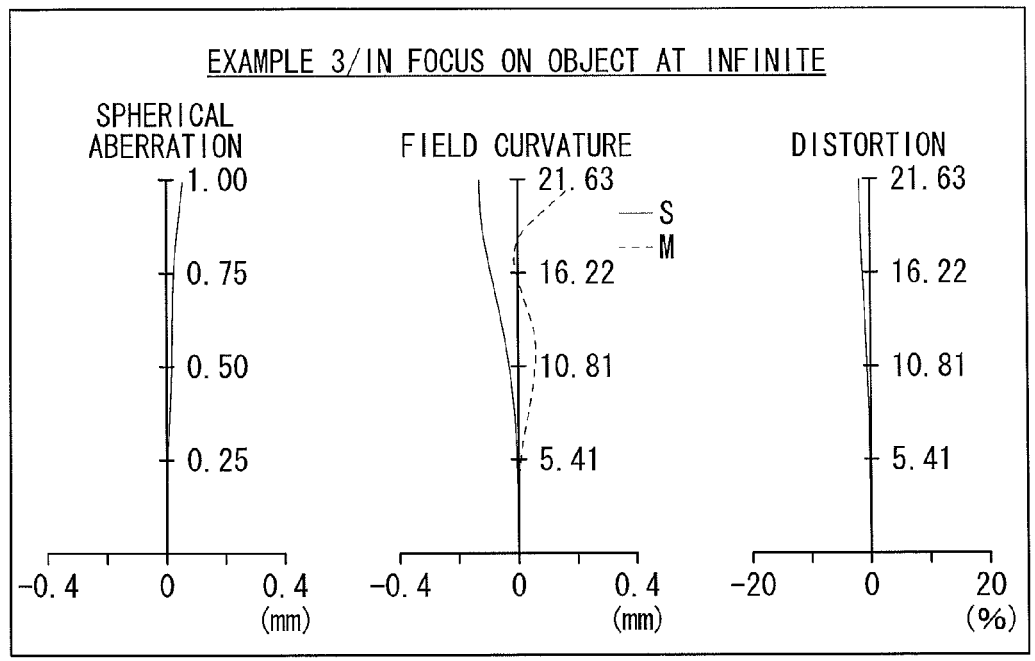
FIG. 10 is an aberration diagram illustrating spherical aberration, field curvature, and distortion of an imaging lens corresponding to Numerical Example 3 in a state that the imaging lens is in focus on an object at infinite.
Figure 11:
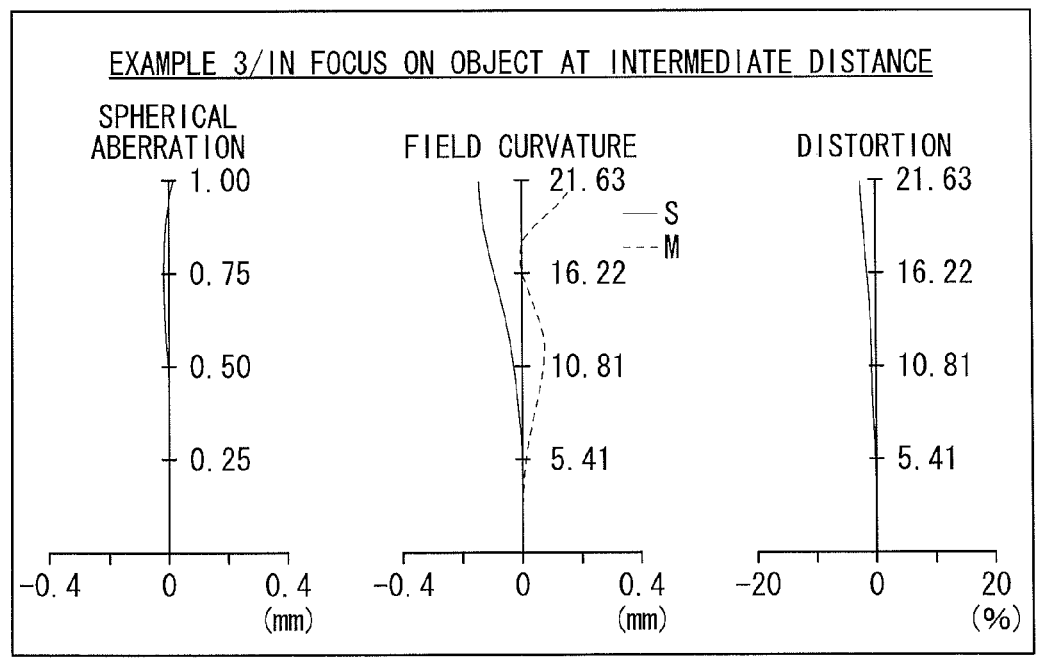
FIG. 11 is an aberration diagram illustrating spherical aberration, field curvature, and distortion of the imaging lens corresponding to Numerical Example 3 in a state that the imaging lens is in focus on an object at an intermediate distance.
Figure 12:
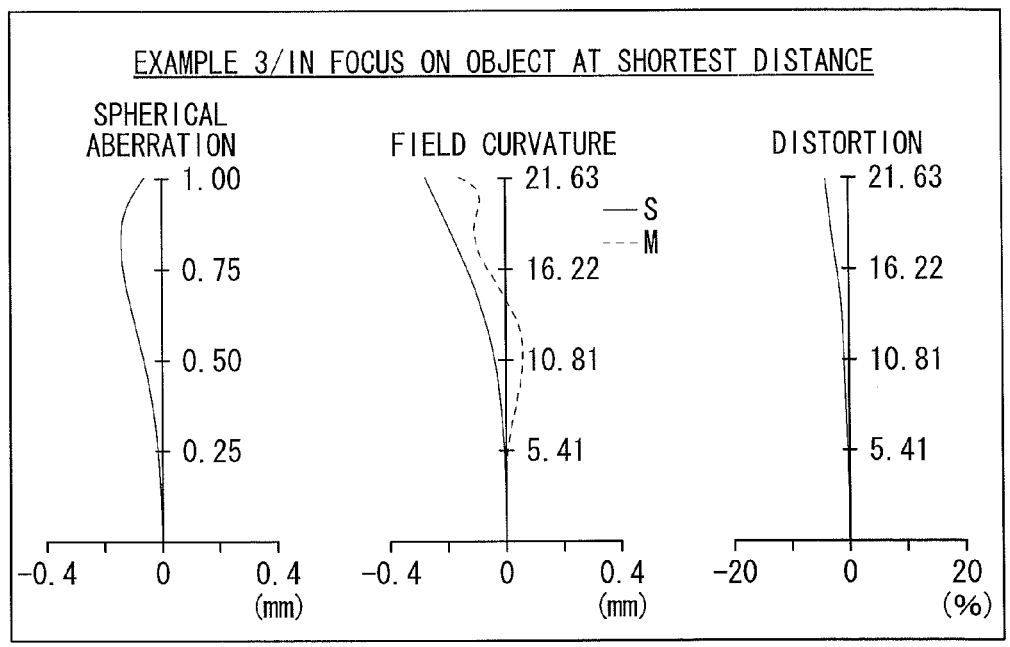
FIG. 12 is an aberration diagram illustrating spherical aberration, field curvature, and distortion of the imaging lens corresponding to Numerical Example 3 in a state that the imaging lens is in focus on an object at a shortest distance.

Aberration performance of the imaging lens 3 corresponding to the above-described Numerical Example 3 is shown in FIGS. 10 to 12. FIG. 10 illustrates aberration in the state that the imaging lens is in focus on an object at infinite. FIG. 11 illustrates aberration in the state that the imaging lens is in focus on an object at the intermediate distance. FIG. 12 illustrates aberration in the state that the imaging lens is in focus on an object at the shortest distance.

FIGS. 10 to 12 illustrate spherical aberration, astigmatism (field curvature), and distortion, as aberration diagrams. In each aberration diagram, aberration is shown with the d line (587.6 nm) as the reference wavelength. In the aberration diagram showing the field curvature, a solid line (S) shows aberration in a sagittal image plane and a dashed line (M) shows aberration in a meridional image plane.

As can be clearly seen from the respective aberration diagrams described above, various kinds of aberration are favorably corrected and superior imaging performance is achieved.

[Numerical Example 4]

Tables 13 to 16 show a specific numerical example corresponding to the imaging lens 4 according to the fourth configuration example shown in FIG. 13. In particular, Table 13 shows basic lens data thereof and Table 14 shows data on aspherical surfaces. Tables 15 and 16 show other data.

The imaging lens 4 includes a first lens group GR1 having negative refractive power, a second lens group GR2 having positive refractive power, a third lens group GR3 having positive refractive power, and a fourth lens group GR4 having negative refractive power that are arranged in order from the object plane toward the image plane. The first lens group GR1 includes a first lens G1 that is configured of a meniscus-shaped negative lens having a convex surface facing toward the object plane. The second lens group GR2 includes a second lens G2 and a third lens G3 that are arranged in order from the object plane toward the image plane. The second lens G2 is configured of a negative lens having a biconcave shape. The third lens G3 is configured of a positive lens having a biconvex shape. The third lens group GR3 includes a cemented lens in which a fourth lens G4 and a fifth lens G5 are cemented to each other and a sixth lens G6 that are arranged in order from the object plane toward the image plane. The fourth lens G4 is configured of a negative lens having a biconcave shape. The fifth lens G5 is configured of a positive lens having a biconvex shape. The sixth lens G6 is a positive lens having a biconvex shape. The fourth lens group GR4 includes a seventh lens G7 and an eighth lens G8 that are arranged in order from the object plane toward the image plane. The seventh lens G7 is configured of a negative lens having a biconcave shape. The eighth lens G8 is configured of a positive lens having a plano-convex shape that has a convex surface facing toward the object plane. The filter FL is arranged between the fourth lens group GR4 and the image plane IMG. The aperture stop S is arranged in the vicinity of the second lens group GR2 on the image plane side, and travels together with the second lens group GR2 upon focusing. Upon focusing, the second lens group GR2 and the third lens group GR3 serve the movable lens groups.

In Numerical Example 4, both surfaces (the fifth surface and the sixth surface) of the positive lens (G3) in the second lens group GR2, an image-sided surface (the tenth surface) of the positive lens (G5) in the third lens group GR3, and both surfaces (the thirteenth surface and the fourteenth surface) of the negative lens (G7) in the fourth lens group GR4 are aspherical surfaces. Values of the 4th-order, 6th-order, 8th-order, and 10th-order aspherical surface coefficients A, B, C, and D of the aspherical surface in Numerical Example 4 are shown together with values of the conic constant K in Table 14.

Table 15 shows values of a focal length f, F-number Fno, and a half angle of view ω in each of the state that the imaging lens is in focus on an object at infinite, the state that the imaging lens is in focus on an object at the intermediate distance, and the state that the imaging lens is in focus on an object at the shortest distance.

In Numerical Example 4, upon focusing from the infinite state to the shortest-distance state, a surface spacing D2 between the first lens group GR1 and the second lens group GR2, a surface spacing D7 between the second lens group GR2 and the third lens group GR3, and a surface spacing D12 between the third lens group GR3 and the fourth lens group GR4 are varied. Table 16 shows values of shooting magnification and variable spacings in each of the state that the imaging lens is in focus on an object at infinite, the state that the imaging lens is in focus on an object at the intermediate distance, and the state that the imaging lens is in focus on an object at the shortest distance.

TABLE 13

Example 4

| lens group | surface number | ri | Di | Ni | vi |
|---|---|---|---|---|---|
| GR1 | 1 | 159.600 | 1.50 | 1.5168 | 64.20 |
|  | 2 | 77.326 | (D2) |  |  |
| GR2 | 3 | −69.425 | 1.00 | 1.8052 | 25.46 |
|  | 4 | 294.900 | 0.30 |  |  |
|  | 5 | 21.781 | 3.58 | 1.8820 | 37.22 |
|  | 6 | −289.804 | 2.50 |  |  |
| (aperture stop) | 7 | 0.000 | (D7) |  |  |
| GR3 | 8 | −18.224 | 1.00 | 1.9229 | 20.88 |
|  | 9 | 34.516 | 4.05 | 1.8820 | 37.22 |
|  | 10 | −46.808 | 0.30 |  |  |
|  | 11 | 192.783 | 5.65 | 2.0010 | 29.13 |
|  | 12 | −26.475 | (D12) |  |  |
| GR4 | 13 | −17.604 | 1.50 | 1.5831 | 59.46 |
|  | 14 | 690.328 | 0.30 |  |  |
|  | 15 | 93.242 | 3.48 | 1.9037 | 31.31 |
|  | 16 | 0.000 | 1.00 |  |  |
| FL | 17 | 0.000 | 1.43 | 1.5490 | 64.20 |
|  | 18 | 0.000 | 0.59 | 1.5190 | 64.20 |
|  | 19 | 0.000 | 0.42 |  |  |
|  | 20 | 0.000 | 0.70 | 1.5168 | 64.20 |
|  | 21 | 0.000 | 0.92 |  |  |

TABLE 14

Example 4 · aspherical surface data

| surface number | K | A | B | C | D |
|---|---|---|---|---|---|
| 5 | 3.1491E−01 | −2.2869E−06 | −2.3122E−09 | 5.0257E−10 | −4.1528E−12 |
| 6 | 0.0000E+00 | 1.1201E−05 | −1.2788E−08 | 4.7065E−10 | −4.6757E−12 |
| 10 | −2.5312E+01 | −5.1489E−06 | 1.8946E−07 | −5.4584E−10 | 1.6124E−12 |
| 13 | −1.1868E+00 | 2.5789E−05 | −2.4014E−07 | 7.2212E−10 | −6.0888E−13 |
| 14 | 0.0000E+00 | 2.0510E−05 | −1.2562E−07 | 2.2322E−10 | −1.1277E−13 |

TABLE 15

Example 4

| | infinite | intermediate distance | shortest distance |
|---|---|---|---|
| f | 33.99 | 32.68 | 30.87 |
| Fno | 2.05 | 2.10 | 2.18 |
| ω | 32.48 | 31.73 | 30.62 |

TABLE 16

Example 4

| | infinite | intermediate distance | shortest distance |
|---|---|---|---|
| shooting magnification | — | 0.06 | 0.15 |
| D2 | 7.33 | 6.04 | 4.08 |
| D7 | 7.86 | 7.56 | 7.11 |
| D12 | 14.60 | 16.19 | 18.60 |

Figure 14:
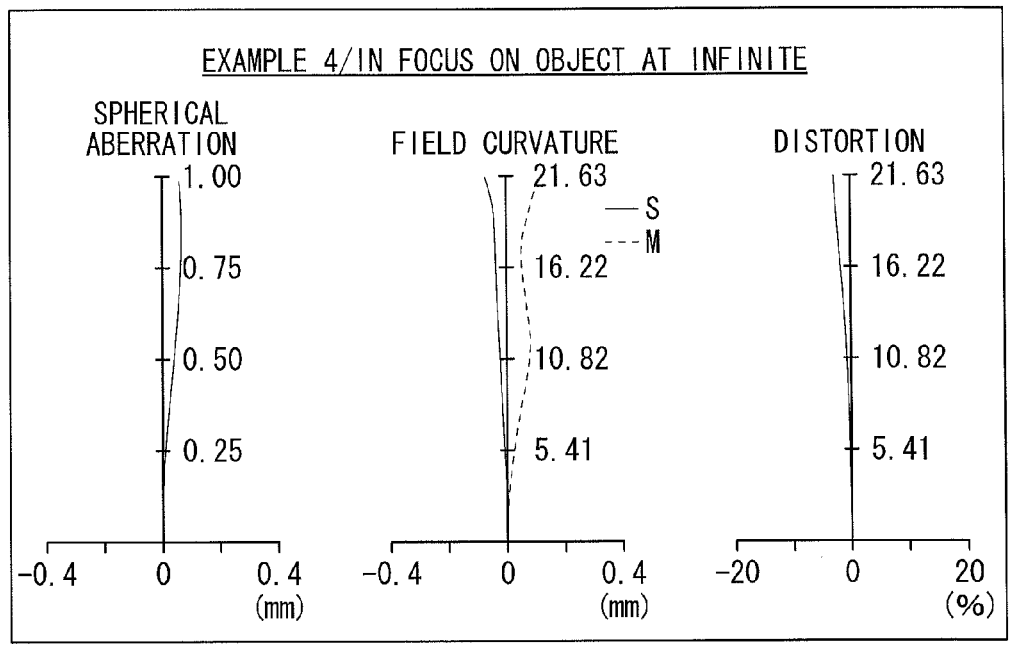
FIG. 14 is an aberration diagram illustrating spherical aberration, field curvature, and distortion of an imaging lens corresponding to Numerical Example 4 in a state that the imaging lens is in focus on an object at infinite.
Figure 15:
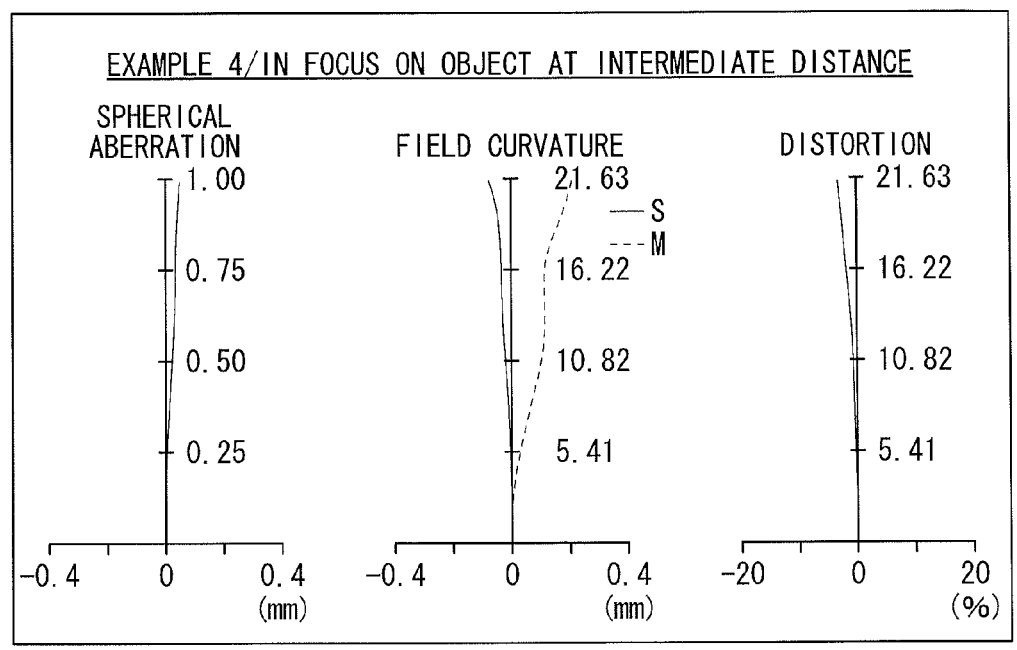
FIG. 15 is an aberration diagram illustrating spherical aberration, field curvature, and distortion of the imaging lens corresponding to Numerical Example 4 in a state that the imaging lens is in focus on an object at an intermediate distance.
Figure 16:
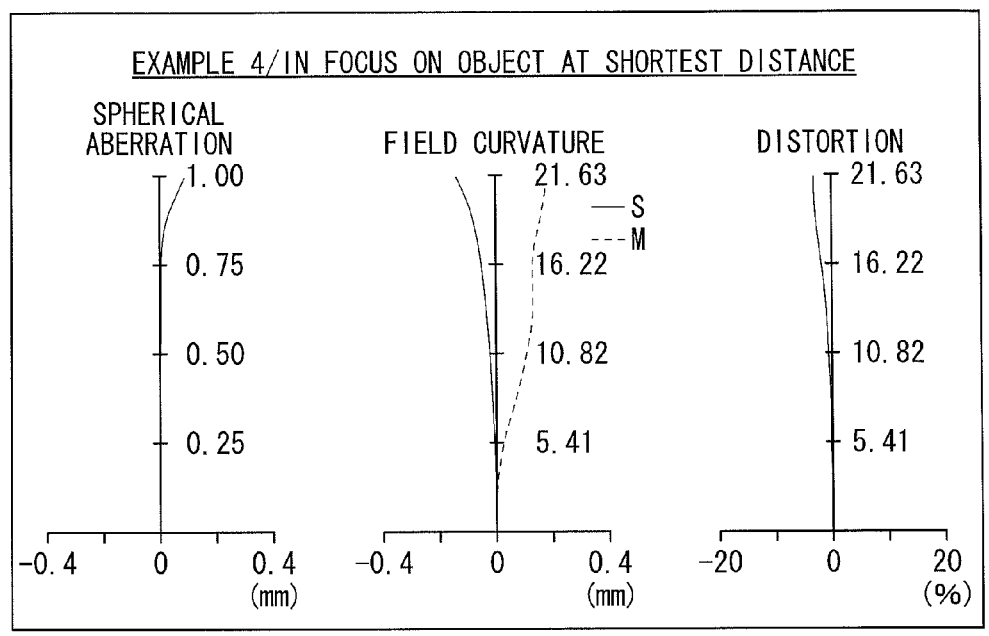
FIG. 16 is an aberration diagram illustrating spherical aberration, field curvature, and distortion of the imaging lens corresponding to Numerical Example 4 in a state that the imaging lens is in focus on an object at a shortest distance.

Aberration performance of the imaging lens 4 corresponding to the above-described Numerical Example 4 is shown in FIGS. 14 to 16. FIG. 14 illustrates aberration in the condition that an object at infinite is in focus. FIG. 15 illustrates aberration in the condition that an object at the intermediate distance is in focus. FIG. 16 illustrates aberration in the condition that an object at the shortest distance is in focus.

FIGS. 14 to 16 illustrate spherical aberration, astigmatism (field curvature), and distortion, as aberration diagrams. In each aberration diagram, aberration is shown with the d line (587.6 nm) as the reference wavelength. In the aberration diagram showing the field curvature, a solid line (S) shows aberration in a sagittal image plane and a dashed line (M) shows aberration in a meridional image plane.

As can be clearly seen from the respective aberration diagrams described above, various kinds of aberration are favorably corrected and superior imaging performance is achieved.

[Other Numerical Value Data of Respective Examples]

Table 17 shows values related to the above-described respective conditional expressions that are summarized for each numerical example. As can be seen from Table 17, the value of each numerical example is within a range of the numerical value for each conditional expression.

TABLE 17

| Conditional Expression | | Example 1 | Example 2 | Example 3 | Example 4 |
|---|---|---|---|---|---|
| ft | | 36.05 | 34.13 | 36.04 | 33.99 |
| fr | | −57.87 | −34.30 | −34.22 | −41.74 |

TABLE 17-continued

| Conditional Expression | | Example 1 | Example 2 | Example 3 | Example 4 |
|---|---|---|---|---|---|
| (1)ft/fr | | −0.62 | −1.00 | −1.05 | −0.81 |
| fra | | −57.87 | −24.98 | −26.21 | −29.30 |
| (2)fra/fr | | 1.00 | 0.73 | 0.77 | 0.70 |
| R1 | | −25.28 | −14.29 | −12.98 | −17.60 |
| R2 | | −98.77 | −174.43 | −87.79 | 690.33 |
| (3)(R1 + R2)/(R1 − R2) | | −1.69 | −1.18 | −1.35 | −0.95 |
| Lr | | 7.01 | 11.11 | 10.69 | 10.33 |
| Y | | 21.63 | 21.63 | 21.63 | 21.63 |
| (4)Lr/Y | | 0.32 | 0.51 | 0.49 | 0.48 |
| TD | | 16.73 | 19.90 | 21.23 | 21.75 |
| (5)TD/Y | | 0.77 | 0.92 | 0.98 | 1.01 |
| TL | | 64.45 | 51.92 | 56.92 | 60.00 |
| (6)TL/Y | | 2.98 | 2.40 | 2.63 | 2.77 |

[5. Other Embodiments]

The technology according to the present disclosure is not limited to the description in the above-described embodiment and the Examples, and may be variously modified. For example, the shape of each part and the numerical values shown in each of the above-described numerical examples are mere examples for implementing the present technology as some specific embodiments of the present technology, and the technical scope of the present technology should not be construed limitedly based thereon.

Moreover, in the above-described embodiment and Examples, the configuration that is substantially configured of three or four lens groups is described. However, a configuration further including a lens that substantially has no refractive power may be adopted.

It is possible to achieve at least the following configurations from the above-described example embodiment of the disclosure.

[1] An imaging lens including:
a movable lens group configured to travel to allow the imaging lens to come into focus; and
a rearmost lens group arranged at a most-image-sided fixed position, and having negative refractive power, wherein
following conditional expression is satisfied, $$-2 < ft/fr < -0.45 \qquad (1)$$

where ft is a total focal length of the imaging lens in a condition that the imaging lens is in focus on an object at infinite, and
fr is a focal length of the rearmost lens group.

[2] The imaging lens according to [1], wherein the rearmost lens group is configured of two or less lenses including a negative lens.

[3] The imaging lens according to [2], wherein the negative lens in the rearmost lens group has an aspherical surface.

[4] The imaging lens according to [2] or [3], wherein following conditional expression is satisfied, $$0.6 < fra/fr \leq 1 \qquad (2)$$

where fra is a focal length of the negative lens in the rearmost lens group.

[5] The imaging lens according to any one of [2] to [4], wherein following conditional expression is satisfied, $$-2<(R1+R2)/(R1-R2)<-0.5 \quad (3)$$

where R1 is a curvature radius of an object-sided surface of the negative lens in the rearmost lens group, and R2 is a curvature radius of an image-sided surface of the negative lens in the rearmost lens group.

[6] The imaging lens according to any one of [1] to [5], wherein following conditional expression is satisfied, $$0.2<Lr/Y<1 \quad (4)$$

where Lr is a distance along an optical axis from a most-object-sided surface in the rearmost lens group to image plane, and Y is a maximum image height along the image plane.

[7] The imaging lens according to any one of [1] to [6], wherein following conditional expression is satisfied, $$0.5<TD/Y<1.4 \quad (5)$$

where TD is a total thickness, along an optical axis, of all lenses included in the imaging lens.

[8] The imaging lens according to any one of [1] to [7], wherein following conditional expression is satisfied, $$2.0<TL/Y<3.5 \quad (6)$$

where TL is a maximum total length, along an optical axis, of the imaging lens.

[9] The imaging lens according to any one of [1] to [8], wherein the movable lens group includes an aspherical surface.

[10] The imaging lens according to any one of [1] to [9], wherein the movable lens group includes two lens groups, and
the two lens groups are configured to travel independently of each other to allow the imaging lens to come into focus.

[11] The imaging lens according to [10], wherein the two lens groups each have positive refractive power.

[12] The imaging lens according to any one of [1] to [11], wherein the rearmost lens group includes one negative lens and one positive lens.

[13] The imaging lens according to any one of [1] to [12], further including a lens substantially having no refractive power.

[14] An image pickup apparatus with an imaging lens and an image pickup device outputting an image pickup signal based on an optical image formed by the imaging lens, the imaging lens including:

a movable lens group configured to travel to allow the imaging lens to come into focus; and
a rearmost lens group arranged at a most-image-sided fixed position, and having negative refractive power, wherein
following conditional expression is satisfied, $$-2<ft/fr<-0.45 \quad (1)$$

where ft is a total focal length of the imaging lens in a condition that the imaging lens is in focus on an object at infinite, and fr is a focal length of the rearmost lens group.

[15] The image pickup apparatus according to [14], further including a lens substantially having no refractive power.

The present application contains subject matter related to that disclosed in Japanese Priority Patent Application JP 2012-199073 filed in the Japan Patent Office on Sep. 11, 2012 the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. An imaging lens, comprising:
   a first lens group that has a positive refractive power, and includes one negative lens and one positive lens arranged in order from an object side;
   a second lens group that has a positive refractive power, and is arranged closer to an imaging side than the first lens group; and
   a rearmost lens group arranged at a most-image-sided fixed position, wherein
   the rearmost lens group is configured of two or less lenses that include a negative lens, and
   the first lens group is configured to travel independently of the second lens group to allow the imaging lens to come into focus, and travel to the object side based on a change in focus from an infinite state to a shortest-distance state,
   wherein following conditional expression is satisfied, $$0.65<TD/Y<1.2,$$

where TD is a total thickness, along an optical axis of the imaging lens, of all lenses included in the imaging lens, and
   wherein following conditional expression is satisfied, $$-1.8<(R1+R2)/(R1-R2)<-0.8$$

where R1 is a first curvature radius of an object-sided surface of the negative lens in the rearmost lens group, and
   R2 is a second curvature radius of an image-sided surface of the negative lens in the rearmost lens group.

2. The imaging lens according to claim 1, wherein the negative lens in the rearmost lens group has an aspherical surface.

3. The imaging lens according to claim 1, wherein following conditional expression is satisfied, $$0.6<fra/fr\leq1$$

where fra is a focal length of the negative lens in the rearmost lens group and fr is a focal length of the rearmost lens group.

4. The imaging lens according to claim 1, wherein following conditional expression is satisfied, $$0.2<Lr/Y<1$$

where Lr is a distance along the optical axis from a most-object-sided surface in the rearmost lens group to image plane, and
   Y is a maximum image height along the image plane.

5. The imaging lens according to claim 1, wherein following conditional expression is satisfied, $$2.0<TL/Y<3.5$$

where TL is a maximum total length, along the optical axis, of the imaging lens.

6. The imaging lens according to claim 1, wherein each of the first lens group and the second lens group includes an aspherical surface.

7. The imaging lens according to claim 1, wherein each of the first lens group and the second lens group has positive refractive power.

8. The imaging lens according to claim 1, wherein the rearmost lens group includes the negative lens and a positive lens.

9. The imaging lens according to claim 1, wherein following conditional expression is satisfied, $-2<ft/fr<-0.45$ where ft is a total focal length of the imaging lens in a condition that the imaging lens is in focus on an object at infinity, and fr is a focal length of the rearmost lens group.

10. An imaging lens, comprising:
a first lens group that has one fixed negative lens or one fixed positive lens;
a second lens group that has a positive refractive power, and arranged closer to an image plane side than the first lens group;
a third lens group that has a positive refractive power, and arranged closer to the image plane side than the second lens group; and
a rearmost lens group arranged at a most-image-sided fixed position, wherein
the rearmost lens group includes a negative lens and a positive lens arranged in order from an object side, and
the second lens group is configured to travel independently of the third lens group to allow the imaging lens to come into focus, and travel to the object side based on a change in focus from an infinite state to a shortest-distance state,
wherein following conditional expression is satisfied, $0.65<TD/Y<1.2,$ where TD is a total thickness, along an optical axis of the imaging lens, of all lenses included in the imaging lens, and
wherein following conditional expression is satisfied, $-1.8<(R1+R2)/(R1-R2)<-0.8$ where R1 is a first curvature radius of an object-sided surface of the negative lens in the rearmost lens group, and
R2 is a second curvature radius of an image-sided surface of the negative lens in the rearmost lens group.

11. The imaging lens according to claim 10, wherein the negative lens in the rearmost lens group has an aspherical surface.

12. The imaging lens according to claim 10, wherein following conditional expression is satisfied, $0.6<fra/fr\leq1$ where fra is a focal length of the negative lens in the rearmost lens group and fr is a focal length of the rearmost lens group.

13. The imaging lens according to claim 10, wherein following conditional expression is satisfied,
ti $0.2<Lr/Y<1$
where Lr is a distance along the optical axis from a most-object-sided surface in the rearmost lens group to image plane, and
Y is a maximum image height along the image plane.

14. The imaging lens according to claim 10, wherein following conditional expression is satisfied, $2.0<TL/Y<3.5$ where TL is a maximum total length, along the optical axis, of the imaging lens.

15. The imaging lens according to claim 10, wherein following conditional expression is satisfied, $-2<ft/fr<-0.45$ where ft is a total focal length of the imaging lens in a condition that the imaging lens is in focus on an object at infinity, and fr is a focal length of the rearmost lens group.

16. The imaging lens according to claim 10, wherein each of the first lens group, the second lens group, and the third lens group includes an aspherical surface.

17. An image pickup apparatus comprising:
an imaging lens; and
an image pickup device configured to output an image pickup signal based on an optical image generated by the imaging lens;
wherein the imaging lens comprises:
    a first lens group that has a positive refractive power, and includes one negative lens and one positive lens arranged in order from an object side;
    a second lens group that has a positive refractive power, and is arranged closer to an imaging side than the first lens group; and
    a rearmost lens group arranged at a most-image-sided fixed position, wherein
        the rearmost lens group is configured of two or less lenses that include a negative lens, and
        the first lens group is configured to travel independently of the second lens group to allow the imaging lens to come into focus, and travel to the object side based on a change in focus from an infinite state to a shortest-distance state,
    wherein following conditional expression is satisfied, $0.65<TD/Y<1.2,$ where TD is a total thickness, along an optical axis of the imaging lens, of all lenses included in the imaging lens, and
    wherein following conditional expression is satisfied, $-1.8<(R1+R2)/(R1-R2)<-0.8$ where R1 is a first curvature radius of an object-sided surface of the negative lens in the rearmost lens group, and
        R2 is a second curvature radius of an image-sided surface of the negative lens in the rearmost lens group.

18. An image pickup apparatus comprising:
an imaging lens; and
an image pickup device configured to output an image pickup signal based on an optical image generated by the imaging lens;
wherein the imaging lens comprises:
    a first lens group that has one fixed negative lens or one fixed positive lens;
    a second lens group that has a positive refractive power, and arranged closer to an image plane side than the first lens group;
    a third lens group that has a positive refractive power, and arranged closer to the image plane side than the second lens group, and
    a rearmost lens group arranged at a most-image-sided fixed position, wherein the rearmost lens group includes a negative lens and a positive lens arranged in order from an object side, and the second lens group is configured to travel independently of the third lens group to allow the imaging lens to come into focus, and travel to the object side based on a change in focus from an infinite state to a shortest-distance state, wherein following conditional expression is satisfied, $0.65 < TD/Y < 1.2$, where TD is a total thickness, along an optical axis of the imaging lens, of all lenses included in the imaging lens, wherein following conditional expression is satisfied, $-1.8 < (R1+R2)/(R1-R2) < -0.8$ where R1 is a first curvature radius of an object-sided surface of the negative lens in the rearmost lens group, and R2 is a second curvature radius of an image-sided surface of the negative lens in the rearmost lens group.

* * * * *